(12) United States Patent
Kasahara

(10) Patent No.: US 8,358,469 B2
(45) Date of Patent: Jan. 22, 2013

(54) IMMERSION MICROSCOPE OBJECTIVE AND MICROSCOPE WITH IT

(75) Inventor: Takashi Kasahara, Tokyo (JP)

(73) Assignee: Olympus Corporation, Tokyo (JP)

( * ) Notice: Subject to any disclaimer, the term of this patent is extended or adjusted under 35 U.S.C. 154(b) by 323 days.

(21) Appl. No.: 12/761,463

(22) Filed: Apr. 16, 2010

(65) Prior Publication Data

US 2010/0265574 A1    Oct. 21, 2010

(30) Foreign Application Priority Data

Apr. 21, 2009   (JP) ................................ 2009-102954
Jan. 14, 2010   (JP) ................................ 2010-005503

(51) Int. Cl.
G02B 21/02 (2006.01)

(52) U.S. Cl. ........................................ 359/658; 359/656

(58) Field of Classification Search .................. 359/368, 359/656–661
See application file for complete search history.

(56) References Cited

U.S. PATENT DOCUMENTS

| | | | | |
|---|---|---|---|---|
| 5,530,590 | A | * | 6/1996 | Saito .............................. 359/658 |
| 5,982,559 | A | | 11/1999 | Furutake | |
| 6,519,092 | B2 | * | 2/2003 | Yamaguchi .................... 359/656 |
| 7,889,432 | B2 | * | 2/2011 | Watanabe et al. .............. 359/656 |
| 2006/0279847 | A1 | | 12/2006 | Matthae et al. | |

FOREIGN PATENT DOCUMENTS

JP           10-274742 A       10/1998

* cited by examiner

Primary Examiner — Thong Nguyen
(74) Attorney, Agent, or Firm — Holtz, Holtz, Goodman & Chick, PC

(57) ABSTRACT

An immersion microscope objective comprises, in order from an object side, a first lens group having a positive refractive power comprising a cemented lens composed of a plano-convex lens whose plane surface faces the object side and a meniscus lens whose concave surface faces the object side, and at least one single lens having a positive refractive power; a second lens group having a positive refractive power comprising a three-piece cemented lens; and a third lens group having a negative refractive power including a Gaussian type lens structure, wherein the objective satisfies the following conditions when n1, NAob, d0 and β are a refractive index at a d-line of the single lens having the highest refractive index included in the first lens group, a numerical aperture on the object side of the objective, a working distance of the objective, and a magnification of the objective, respectively.

$1.7 \leq n1$ $0.75 \leq NAob \leq 1.45$ $0.4 \leq NAob*d0 \leq 3$ $0.03 \leq NAob/\beta \leq 0.1$

10 Claims, 18 Drawing Sheets

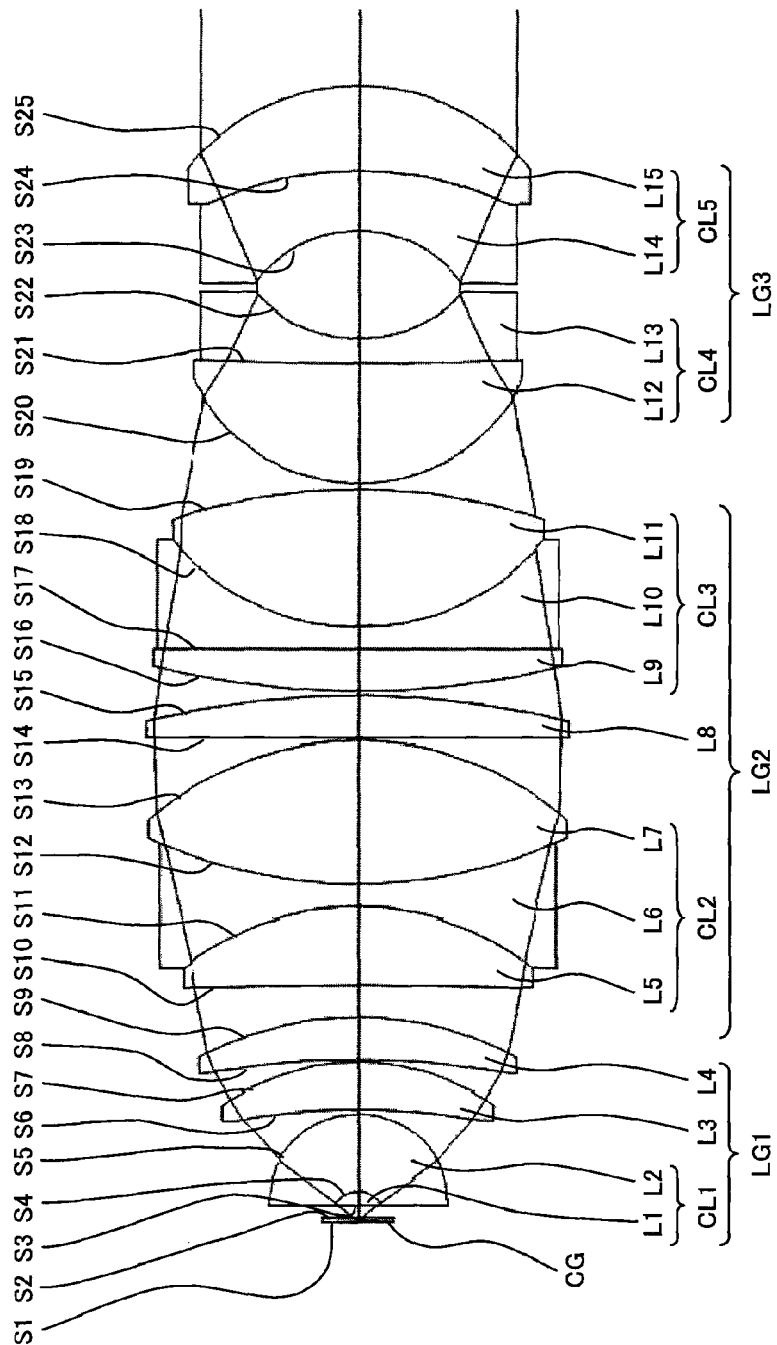
F I G. 4

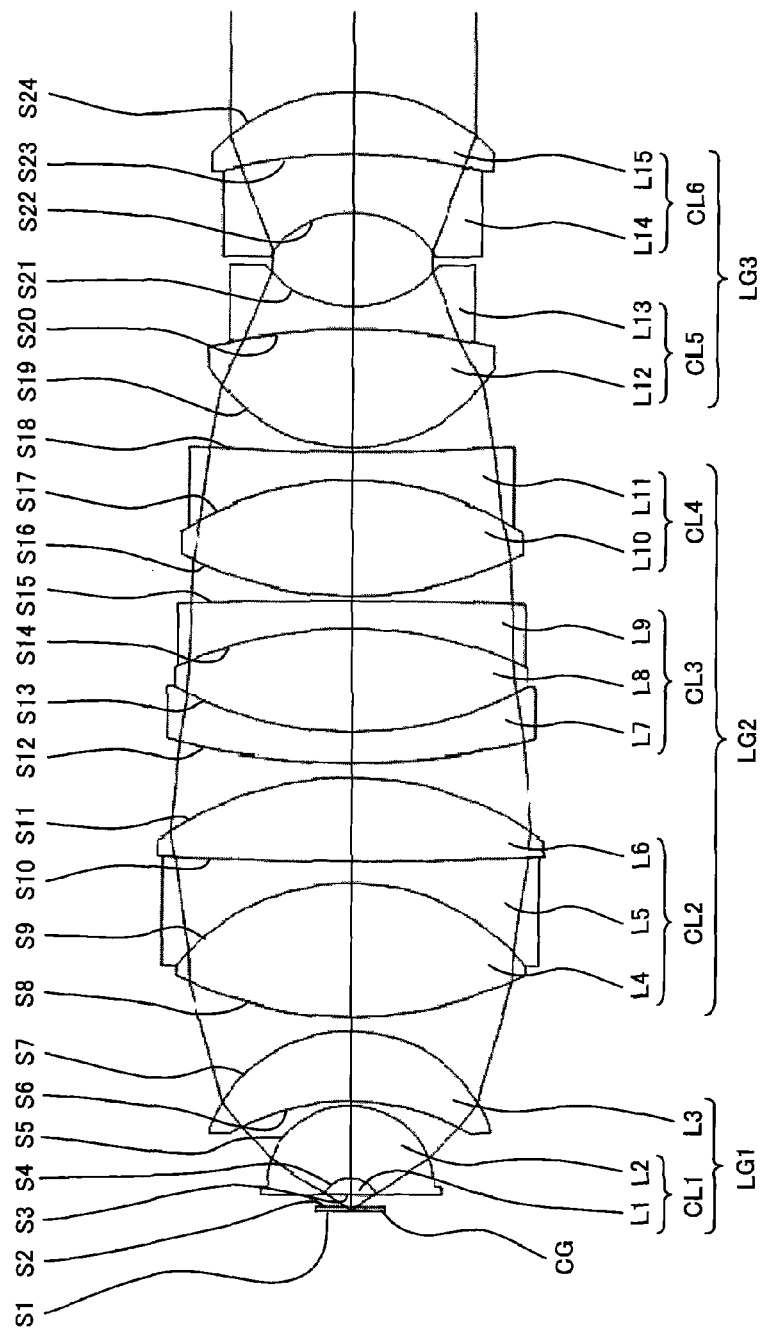
F I G. 6

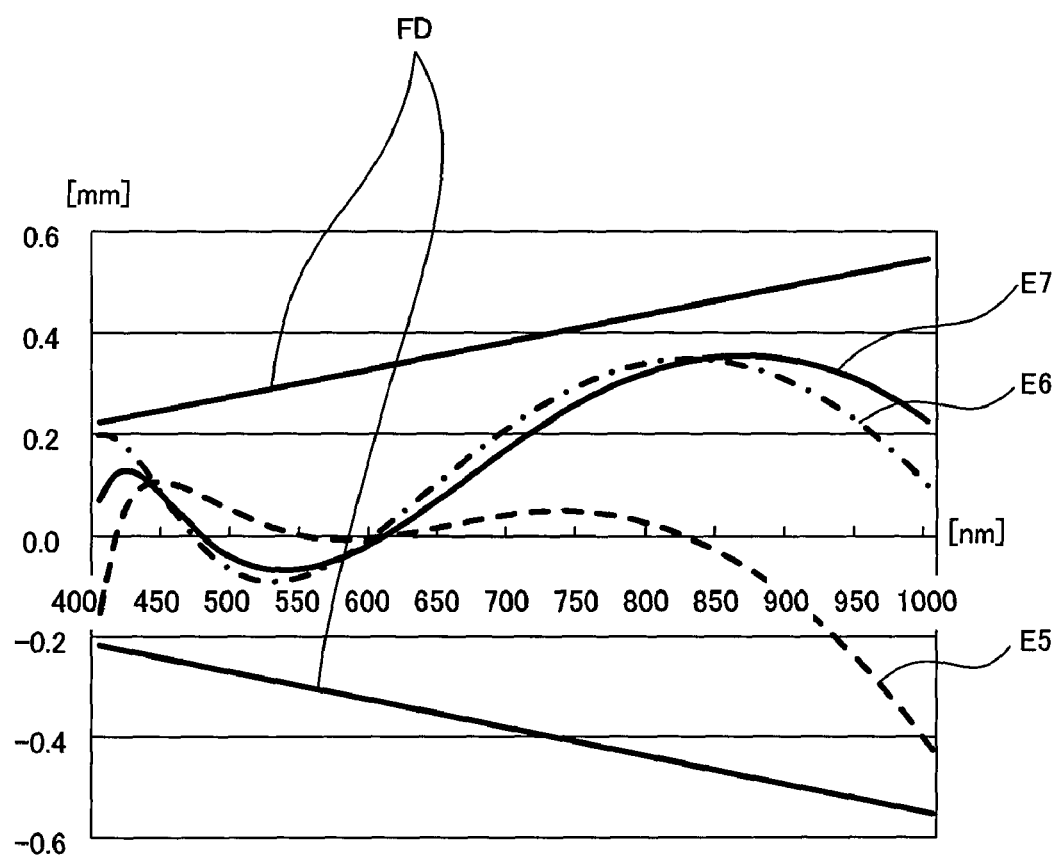
F I G. 1 8

IMMERSION MICROSCOPE OBJECTIVE AND MICROSCOPE WITH IT

CROSS REFERENCE TO RELATED APPLICATIONS

This application is based upon and claims the benefit of priority from prior Japanese Patent Application Nos. 2010-005503, filed on Jan. 14, 2010 and 2009-102954 filed on Apr. 21, 2009, the entire contents of which are incorporated herein by reference.

BACKGROUND OF THE INVENTION

1. Field of the Invention

The present invention relates to an immersion microscope objective and a microscope provided with it.

2. Description of the Related Art

Fluorescent observation is widely known as a method for observing a living body. Fluorescent observation is a method for observing a specimen by applying excitation light to a living body specimen to which a tag is attached by fluorescent dye and detecting fluorescent light generated from the fluorescent dye. The fluorescent dye is selectively combined with a specific molecule and a component object in the living body specimen and dyes them. Therefore, the behavior, combination state, movement state and the like of molecules in the specimen can be observed in addition to the structure of the specimen by detecting the fluorescent light.

Traditionally, the burden on a specimen due to dyeing with fluorescent dye has been heavy and living body targets that can be observed while living have been limited to a cell's level, such as a culture cell, and the like. However, recently, a fluorescent protein which can be expressed in a cell by introducing a gene has been put into practical use and damage to the living body specimen can be reduced by using this protein. GFP (green fluorescent protein), YFP (yellow fluorescent protein) or the like are examples of such a protein. The number of targets of fluorescent observation has been expanded by the commercialization of these fluorescent proteins and currently various living body specimens can be observed.

Japanese Laid-open Patent Publication No. 10-274742 discloses an immersion microscope objective usable for such a fluorescent observation.

SUMMARY OF THE INVENTION

One aspect of the present invention provides an immersion microscope objective which comprises a first lens group having a positive refractive power, including a cemented lens composed of a plano-convex lens whose plane surface faces the object side and a meniscus lens whose concave surface faces the object side, and at least one of a single lens having a positive refractive power, a second lens group having a positive refractive power, including a three-piece cemented lens, and a third lens group having a negative refractive power, including a Gaussian type lens structure, in order from the object side, and which satisfies the following conditions when n1, NAob, d0 and β are a refractive index at a d-line of the single lens having the highest refractive index included in the first lens group, a numerical aperture on the object side of the immersion microscope objective, a working distance of the immersion microscope objective and a magnification of the immersion microscope objective, respectively:

$1.7 \leq n1$ $0.75 \leq NAob \leq 1.45$ $0.4 \leq NAob \cdot d0 \leq 3$ $0.03 \leq NAob/\beta \leq 0.1$ Another aspect of the present invention provides an immersion microscope objective which comprises a first lens group having a positive refractive power, including a cemented lens composed of a plano-convex lens whose plane surface faces the object side and a meniscus lens whose concave surface faces the object side, and at least one single lens having a positive refractive power, a second lens group having a positive refractive power, including a three-piece cemented lens, and a third lens group having a negative refractive power, including a Gaussian type lens structure, in order from the object side, and in which the second lens group includes a first three-piece cemented lens composed of a positive refractive lens, a negative refractive lens and a positive refractive lens, a lens, and a second three-piece cemented lens composed of a positive refractive lens, a negative refractive lens and a positive refractive lens, in order from the object side.

Another aspect of the present invention provides an immersion microscope objective which comprises a first lens group having a positive refractive power, including a cemented lens composed of a plano-convex lens whose plane surface faces the object side and a meniscus lens whose concave surface faces the object side, and at least one of a single lens having a positive refractive power, a second lens group having a positive refractive power, including a three-piece cemented lens, and a third lens group having a negative refractive power, including a Gaussian type lens structure, in order from the object side, and in which the change in width of a focal position is within a focal depth between a visible light range and a near-infrared light range.

Another aspect of the present invention provides a confocal microscope which comprises an immersion microscope objective, a laser light source for emitting laser light, a separation unit for separating fluorescent light generated from a specimen to which the laser light is applied from the laser light, a scanning unit for scanning the specimen, a confocal stop disposed in a optically conjugate position with the focal position of the immersion microscope objective, and a detector for detecting the fluorescent light that has passed through the confocal stop. The immersion microscope objective comprises a first lens group having a positive refractive power, including a cemented lens composed of a plano-convex lens whose plane surface faces the object side and a meniscus lens whose concave surface faces the object side, and at least one single lens having a positive refractive power, a second lens group having a positive refractive power, including a three-piece cemented lens, and a third lens group having a negative refractive power including a Gaussian type lens structure and which satisfies the following conditions when n1, NAob, d0 and β are a refractive index at a d-line of the single lens having the highest refractive index included in the first lens group, a numerical aperture on the object side of the immersion microscope objective, a working distance of the immersion microscope objective and a magnification of the immersion microscope objective, respectively:

$1.7 \leq n1$ $0.75 \leq NAob \leq 1.45$ $0.4 \leq NAob \cdot d0 \leq 3$ $0.03 \leq NAob/\beta \leq 0.1$ Another aspect of the present invention provides a two-photon excitation microscope which comprises an immersion microscope objective, an ultra-short-pulse laser light source for emitting laser light that causes two-photon excitation in a specimen, a separation unit for separating fluorescent light generated from the specimen to which the laser light is applied from the laser light, a scanning unit for scanning the specimen, and a detector for detecting the fluorescent light. The immersion microscope objective comprises a first lens group having a positive refractive power, including a cemented lens composed of a plano-convex lens whose plane surface faces the object side and a meniscus lens whose concave surface faces the object side, and at least one single lens having a positive refractive power, a second lens group having a positive refractive power, including a three-piece cemented lens, and a third lens group having a negative refractive power including a Gaussian type lens structure, and which satisfies the following conditions when n1, NAob, dO and β are a refractive index at a d-line of the single lens having the highest refractive index included in the first lens group, a numerical aperture on the object side of the immersion microscope objective, a working distance of the immersion microscope objective and a magnification of the immersion microscope objective, respectively.

$1.7 \leq n1$ $0.75 \leq NAob \leq 1.45$ $0.4 \leq NAob*dO \leq 3$ $0.03 \leq NAob/\beta \leq 0.1$

BRIEF DESCRIPTION OF THE DRAWINGS

The present invention will be more apparent from the following detailed description when the accompanying drawings are referenced.

FIG. 4 is a cross-sectional view of an immersion microscope objective according to the second preferred embodiment of the present invention.

FIG. 6 is a cross-sectional view of an immersion microscope objective according to the third preferred embodiment of the present invention.

FIG. 18 explains the change characteristic of the focal position of an objective, due to the wavelength of the two-photon excitation microscope exemplified in FIG. 17.

DESCRIPTION OF THE PREFERRED EMBODIMENTS

Firstly, matters common to respective preferred embodiments of the present invention will be explained. The configurations and functions of respective lens groups will be roughly explained with reference to FIG. 1.

Figure 1:
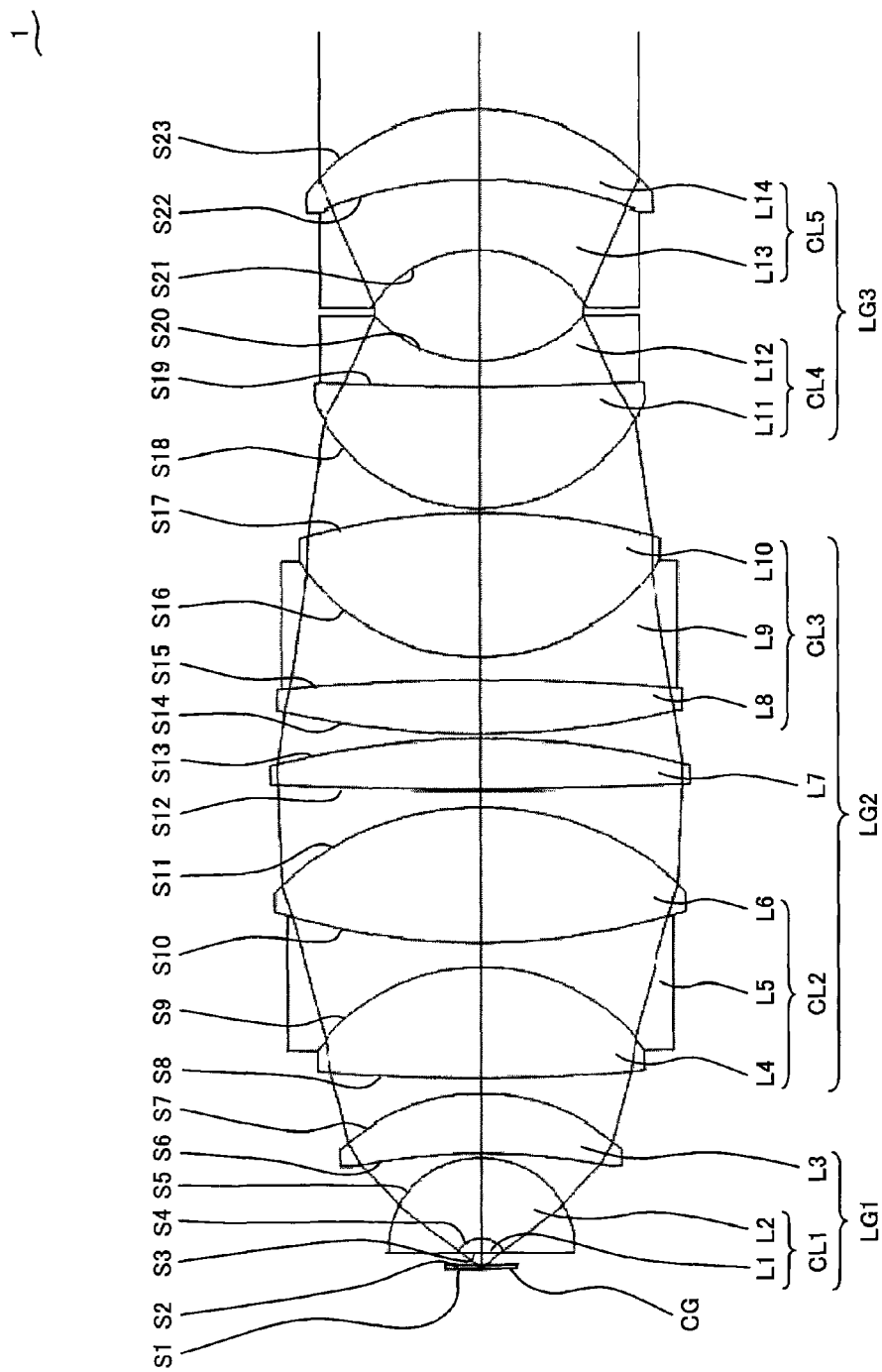
FIG. 1 is a cross-sectional view of an immersion microscope objective according to the first preferred embodiment of the present invention.

The first lens group LG1 has, in order from an object side, a positive refractive power and includes a cemented lens CL1 composed of a plano-convex lens L1 whose plane surface faces the object side and a meniscus lens L2 whose concave surface faces the object side, and a single lens L3 having a positive refractive power. In FIG. 1, a cover glass CG is also exemplified together with an objective 1. The objective 1 is an immersion microscope objective and immersion liquid, which is not illustrated, is put between the cover glass CG and the plano-convex lens L1 in order to realize a large numerical aperture.

In the objective 1, the numerical aperture and the working distance are balanced by using the plano-convex lens L1 disposed nearest the object side, and the large numerical aperture and a long working distance are secured. Furthermore, the focal length of the cemented lens CL1 is increased by cementing the plano-convex lens L1 with the meniscus lens L2. Thus, a longer working distance can be secured. Since its Petzval sum can be corrected for by the meniscus lens, its field curvature can also be suppressed. As a result, a wide field of view (observation range) can be secured. In other words, the objective 1 can secure a long working distance while realizing both a wide observation range and the large numerical aperture by using the cemented lens CL1 which is composed of the plano-convex lens L1 and the meniscus lens L2 and which is disposed nearest the object side.

Furthermore, the objective 1 is provided with a single lens L3 having a positive refractive power in the first lens group LG1. The single lens L3 suppresses the ray height of divergent light emitted from the meniscus lens L2 and corrects high-order spherical and coma aberrations. Therefore, it becomes necessary for the single lens L3 to have a strong positive refractive power. The objective 1 is structured in such a way that the single lens L3 may attain a strong positive refractive power by using a material with a high refractive index for the single lens L3. Thus, the objective 1 can correct spherical and coma aberrations in the first lens group without increasing the total length of the first lens group excessively. The same effect can also be obtained by using a single lens group composed of the single lens L3 and a single lens having a positive refractive power instead of the single lens L3.

The second lens group LG2 has a positive refractive power. The second lens group LG2 converts divergent light emitted from the first lens group LG1 to convergent light and also corrects its chromatic aberration. For fluorescent light used in a fluorescent observation, light having various wavelengths in a visible light wavelength range is used. Therefore, for an objective used for a fluorescent observation, it is necessary for chromatic aberration to also be sufficiently corrected. The correction of a chromatic aberration is realized by the second lens group LG2 including a three-piece cemented lens.

It is preferable that the second lens group LG2 also include at least two cemented lenses and that the cemented lens CL2 disposed nearest the object side of the second lens group LG2 be a three-piece cemented lens composed of a positive refractive lens L4, a negative refractive lens L5 and a positive refractive lens L6. It is preferable that the second lens group LG2 also include a three-piece cemented lens CL2 composed of a positive refractive lens L4, a negative refractive lens L5 and a positive refractive lens L6, a lens L7, and a three-piece cemented lens CL3 composed of a positive refractive lens L8, a negative refractive lens L9, and a positive refractive lens L10, in order from the object side.

The third lens group LG3 has a negative refractive power, that is, a so-called Gaussian type lens structure. The third lens group LG3 comprises a cemented lens CL4 composed of a lens L11 having a positive refractive power and a lens L12 having a negative refractive power and a cemented lens CL5 composed of a lens L13 having a negative refractive power and a lens L14 having a positive refractive power, in order from the object side. The lenses L12 and L13 are lenses whose concave surfaces face the image and object sides, respectively, and their concave surfaces are opposed to each other.

A single meniscus lens whose convex surface faces the object side can also be used instead of the cemented lens CL4.

The third lens group LG3 converts convergent light from the second lens group LG2 to parallel light and emits it while largely correcting an off-axis aberration. In other words, the objective 1 is an infinity corrected objective.

The objective 1 has the above structure and also satisfies the following conditions (1) through (4).

$$1.7 \leq n1 \quad (1)$$

$$0.75 \leq NAob \leq 1.45 \quad (2)$$

$$0.4 \leq NAob*d0 \leq 3 \quad (3)$$

$$0.03 \leq NAob/\beta \leq 0.1 \quad (4)$$

In the above expressions, n1, NAob, d0 and β are the refractive index at the d-line of the single lens L3 included in the first lens group LG1, the numerical aperture on the object side of the objective 1, the working distance of the objective 1, and the magnification of the objective 1, respectively. When the first lens group LG1 includes a plurality of single lenses, n1 is the highest refractive index at the d-line of one of the single lenses included in the first lens group LG1.

Conditional expression (1) regulates the refractive index at the d-line of a single lens included in the first lens group LG1. When conditional expression (1) is satisfied, the occurrence of high-order spherical and coma aberrations can be suppressed in addition to the suppression of the occurrence of a chromatic aberration. If the value of conditional expression (1) falls below the lower limit (1.7), the ray height of the divergent light emitted from the meniscus lens L2 excessively increases and the occurrence of high-order spherical and coma aberrations cannot be suppressed.

Conditional expression (2) regulates the numerical aperture on the object side of an objective. When conditional expression (2) is satisfied, the brightness necessary for a fluorescent observation can be secured and a light fluorescent image can be observed. If the value of conditional expression (2) falls below the lower limit (0.75), sufficient light cannot be taken in from the object side, sufficient brightness cannot be obtained, and a fluorescent image becomes dark. If the value rises beyond its upper limit (1.45), it becomes difficult to observe the inside of a living body specimen. In order to increase the numerical aperture on the object side beyond 1.45, it is necessary to increase the refractive index of immersion liquid beyond 1.45. However, generally the refractive index of a living body specimen is 1.4 or less. Therefore, if the refractive index of immersion liquid is 1.45 or more, a difference in a refractive index between a living body specimen and an immersion liquid increases and affects aberrations. Particularly when the inside of a living body specimen is observed, the quality of a fluorescent image greatly deteriorates.

Conditional expression (3) regulates a relation between the numerical aperture on the object side of an objective and working distance of an objective. When conditional expression (3) is satisfied, a numerical aperture and a working distance that are necessary to observe a living body specimen can be secured. If the value of conditional expression (3) falls below the lower limit (0.4), it becomes difficult to secure a working distance sufficient to observe the inside of a living body specimen. Even when a sufficient working distance can be secured, it becomes difficult to obtain a brightness necessary for a fluorescent observation. If the value rises beyond the upper limit (3.0), it becomes difficult to make an objective whose aberrations are sufficiently corrected small and the objective 1 becomes large.

Conditional expression (4) regulates a relation between the numerical aperture on the object side of an objective and magnification of an objective. When conditional expression (4) is satisfied, a brightness necessary for a fluorescent observation ranging particularly from a low to middle magnification can be secured. If the value of conditional expression (4) falls below the lower limit (0.03), it becomes difficult to obtain a sufficient brightness in the range from low to middle magnification and a fluorescent image becomes dark.

If the value rises beyond the upper limit (0.1), it becomes difficult to correct a wide range of aberrations within the limited total length of the objective 1. As a result, it becomes difficult to observe a wide range at a sufficient brightness.

Thus, an immersion microscope objective having a long working distance together with both a wide observation range and a large numerical aperture and having good optical performance can be provided.

It is preferable that the objective 1 further satisfy the following conditions (5) through (7) in addition to conditions (1) through (4).

$$0.3 < f2a/f2b < 2 \quad (5)$$

$$|nx-ny| < 0.35 \quad (6)$$

$$30 < |vx-vy| \quad (7)$$

It is also preferable that the objective 1 further satisfy the following conditions (5-1) through (7-1) instead of conditions (5) through (7).

$$0.38 < f2a/f2b < 1.2 \quad (5\text{-}1)$$

$$|nx-ny| < 0.25 \quad (6\text{-}1)$$

$$35 < |vx-vy| \quad (7\text{-}1)$$

In the above expressions, f2a, f2b, nx, vx, ny and vy are the focal length of the three-piece cemented lens CL2 which is disposed nearest the object side of the second lens group LG2 and which is composed of the positive refractive lens L4, the negative refractive lens L5 and the positive refractive lens L6; the focal length of the three-piece cemented lens CL3 disposed nearest the image side of the second lens group LG2; the refractive index at the d-line of the positive refractive lenses (lenses L4 and L6) of the three-piece cemented lens CL2 disposed nearest the object side of the second lens group LG2; the Abbe number at the d-line of the positive refractive lenses (lenses L4 and L6) of the three-piece cemented lens CL2 disposed nearest the object side of the second lens group LG2; the refractive index at the d-line of the negative refractive lens L5 of the three-piece cemented lens CL2 disposed nearest the object side of the second lens group LG2; and the Abbe number at the d-line of the negative refractive lens L5 of the three-piece cemented lens CL2 disposed nearest the object side of the second lens group LG2, respectively.

The nx and ny of conditions (6), (7), (6-1) and (7-1) can also be applicable to only the positive refractive lens (lens L4) disposed nearest the object side of the three-piece cemented lens CL2 disposed nearest the object side of the second lens group LG2.

Conditional expression (5) regulates the ratio of the focal length of a cemented lens disposed nearest the object side to the focal length of a cemented lens disposed nearest the image side that is included in the second lens group. When conditional expression (5) is satisfied, a chromatic aberration can be effectively corrected by a cemented lens while ray height for effectively maintaining the Petzval sum is secured. If the value of conditional expression (5) falls below the lower limit (0.35), the refractive power of the cemented lens CL2 disposed nearest the object side becomes excessive. Therefore, its ray height is excessively lowered and it becomes difficult to effectively maintain the Petzval sum. If the value rises beyond the upper limit (2), the refractive power of the cemented lens CL2 disposed nearest the object side becomes insufficient. Therefore, its ray height is excessively raised and it becomes difficult to correct a chromatic aberration by a cemented lens.

Conditional expression (6) regulates a difference in a refractive index at the d-line between the positive and negative refractive lenses of a cemented lens disposed nearest the image side, which is included in the second lens group. Conditional expression (7) regulates a difference in an Abbe number at the d-line between the positive and negative refractive lenses of a cemented lens disposed nearest the image side that is included in the second lens group. When conditions (6) and (7) are satisfied in one of the positive refractive lenses (lenses L4 and L6) and the negative refractive lens (lens L5) included in the cemented lens CL2 disposed nearest the object side, an on-axis chromatic aberration can be sufficiently corrected. If the value of conditional expression (6) rises beyond the upper limit (0.35), it becomes difficult to correct an on-axis chromatic aberration since the amount of refraction on a cemented surface becomes insufficient. If the value of conditional expression (7) falls below the lower limit (30), it becomes difficult to correct an on-axis chromatic aberration since the difference in an Abbe number becomes insufficient.

It is also preferable that the objective 1 further satisfy the following conditions (8) through (11) in addition to conditions (1) through (4).

$$0.12 \leq d1/d \leq 0.3 \quad (8)$$

$$-0.1 \leq fm/fs \leq 0 \quad (9)$$

$$2.5 \leq fs/ds \leq 6.3 \quad (10)$$

$$0.2 \leq Rmob/Rmim \leq 0.5 \quad (11)$$

It is more preferable that the objective 1 satisfy the following conditions (8-1) through (11-1) instead of the above conditions (8) through (11).

$$0.12 \leq d1/d \leq 0.2 \quad (8\text{-}1)$$

$$-0.4 \leq fm/fs \leq -0.2 \quad (9\text{-}1)$$

$$3 \leq fs/ds \leq 6 \quad (10\text{-}1)$$

$$0.25 \leq Rmob/Rmim \leq 0.4 \quad (11\text{-}1)$$

In the above expressions, d1, d and ds are the total length of the first lens group LG1, the total length of the objective 1, and the total length of the single lens L3 included in the first lens group or the summed total length of a single lens group including the single lens L3, respectively. fm and fs are the focal length of the meniscus lens L2 and the focal length of the single lens L3 included in the first lens group LG1 or the composite focal length of a single lens group, respectively. Rmob and Rmim are the radius of curvature on the object side of the meniscus lens L2 and the radius of curvature on the image side of the meniscus lens L2, respectively.

Conditional expression (8) regulates the ratio of the total length of the first lens group LG1 to the total length of the objective 1. When conditional expression (8) is satisfied, the large numerical aperture and a long working distance can be realized while its optical performance is secured. If the value of conditional expression (8) falls below the lower limit (0.12), the first lens group LG1 refracts light from a living body specimen by a short total length. Therefore, the refractive power of the first lens group LG1 becomes excessively strong and it becomes difficult to correct high-order spherical and coma aberrations in a large numerical aperture. It also becomes difficult to secure a sufficiently long working distance. If the value rises beyond the upper limit (0.3), the total length of the first lens group LG1 becomes excessively long and the space of the second lens group LG2 and after decreases. Therefore, it becomes difficult to sufficiently correct a chromatic aberration in the second lens group LG2 and after.

Conditional expression (9) regulates a relation between the focal length of the meniscus lens L2 included in the first lens group and that of the positive refractive single lens L3 (or the composite focal length of a single lens group). When conditional expression (9) is satisfied, the focal length of the first lens group can be secured while the Petzval sum is effectively maintained. If the value of conditional expression (9) falls below the upper limit (−1.0), the focal length of the positive refractive single lens L3 (or the composite focal length of a single lens group) becomes excessively short. Therefore, the refractive power of the positive refractive single lens L3 (or a single lens group) included in the first lens group becomes excessively strong and it becomes difficult to correct high-order spherical and coma aberrations when using a large numerical aperture, taking into consideration a refractive index regulated in conditional expression (1). If the value rises beyond the upper limit (0), the meniscus lens L2 has a positive refractive index and it becomes difficult to correct the Petzval sum by the meniscus lens L2. Therefore, a field curvature becomes easy to occur and it becomes difficult to secure a wide field of view.

Conditional expression (10) regulates a relation between the focal length of a single lens L3 (or the composite focal length of a single lens group) included in the first lens group and the total length of the single lens L3 (total length of a single lens group). When conditional expression (10) is satisfied, sufficient refractive power can be secured while the occurrence of aberrations is suppressed in a single lens or a single lens group. If the value of conditional expression (10) falls below the lower limit (2.5), the focal length of a single lens or a single lens group in relation to the total length of the single lens (or the single lens group) becomes excessively short. Therefore, the refractive power of the single lens L3 (or a single lens group) becomes excessively strong, taking into consideration the refractive index regulated in conditional expression (1), and it becomes difficult to correct high-order spherical and coma aberrations in a large numerical aperture. If the value rises beyond the upper limit (6.3), it becomes difficult for the single lens L3 or the single lens group to obtain sufficient refractive power with a short total length and the total length of the first lens group increases. As a result, the space of the second lens group LG2 and after decreases and it becomes difficult to sufficiently correct a chromatic aberration.

Conditional expression (11) regulates a relation between the curvature radii on the object and image sides of the meniscus lens L2 included in the first lens group LG1. When conditional expression (11) is satisfied, a field curvature can be suppressed while a long working distance is secured. If the value of conditional expression (11) falls below the lower limit (0.2) of conditional expression (11), the radius of curvature on the image side excessively increases compared with that on the object side. Therefore, a divergence function on a curvature surface on the object side increases compared with a convergence function on a curvature surface on the image side and the height of a ray emitted from a meniscus lens becomes excessively large. As a result, it becomes difficult to secure a sufficiently long working distance. If the value of conditional expression (11) rises beyond the upper limit (0.5), the converging function in the meniscus lens increases and it becomes difficult to sufficiently correct the Petzval sum in the meniscus lens. Therefore, a field curvature becomes easy to occur and it becomes difficult to secure a wide field of view.

Although in the objective 1 a Gaussian type lens structure included in the third lens group comprises a cemented lens CL4 whose concave surface faces the image side and a cemented lens CL5 whose concave surface faces the object side, in order from the object side, the Gaussian type lens structure is not limited to this. A Gaussian type lens structure included in the third lens group can also comprise a single lens whose concave surface faces the image side and a cemented lens whose concave surface faces the object side, in order from the object side.

In this case, it is preferable that the objective further satisfy the following conditional expression (12) in addition to conditions (1) through (4).

$$0.05 < |f3a/f3b| < 0.5 \qquad (12)$$

It is more preferable that the objective satisfy the following conditional expression (12-1) instead of the above conditional expression (12).

$$0.07 < |f3a/f3b| < 0.2 \qquad (12\text{-}1)$$

In the above expressions, f3a and f3b are the focal length of a single lens whose concave surface faces the image side, composing a Gaussian type lens structure, and the focal length of a cemented lens whose concave surface faces the object side, also composing a Gaussian type lens structure, respectively.

Conditional expression (12) regulates a relation between the focal lengths of lenses whose concave surfaces face each other, composing a Gaussian type lens structure. When conditional expression (12) is satisfied, both the Petzval sum and a chromatic aberration can be effectively corrected in a compact Gaussian type lens structure. If the value of conditional expression (12) falls below the lower limit (0.05), the refractive power of a single lens whose concave surface faces the image side excessively increases. Therefore, its ray height becomes excessively large and it becomes difficult to correct a chromatic aberration. If the value rises beyond the upper limit (0.5), the refractive power of a single lens whose concave surface faces the image side excessively decreases. Therefore, a sufficiently large ray height cannot be secured and it becomes difficult to correct the Petzval sum.

The second lens group LG2 can also comprise a cemented lens capable of moving along the optical axis in order to make one with an objective with a correction collar.

In this case, it is preferable that the objective satisfy the following conditional expression (13) in addition to conditions (1) through (4).

$$|f/f2c| < 0.2 \qquad (13)$$

It is also preferable that the objective satisfy the following conditional expression (13-1) instead of the above conditional expression (13).

$$|f/f2c| < 0.1 \qquad (13\text{-}1)$$

In the above expressions, f and f2c are the focal length of the entire objective and the focal length of the movable cemented lens included in the second lens group, respectively.

Conditional expression (13) regulates the ratio of the focal length of the entire objective to that of a movable cemented lens included in the second lens group. When conditional expression (13) is satisfied, a spherical aberration caused by a difference in thickness between individuals of cover glass can be effectively corrected by moving the movable cemented lens. If the value of conditional expression (13) rises beyond the upper limit (0.2), the positive or negative refractive power of the movable cemented lens increases excessively. Therefore, even though a spherical aberration can be corrected by the movement of the cemented lens, other aberrations, such as chromatic aberration, coma aberration and the like cannot be corrected and the performance of the objective deteriorates.

Conditions (1) through (13) can also be arbitrarily combined. Further, each conditional expression is restricted only by either its upper or lower limit.

First Embodiment

FIG. 1 is a cross-sectional view of an immersion microscope objective according to this preferred embodiment.

An objective 1 comprises a first lens group LG1 having a positive refractive power, a second lens group LG2 having a positive refractive power, and a third lens group LG3 having a negative refractive power, in order from the object side.

The second lens group LG2 comprises a three-piece cemented lens CL2 having a positive, negative and positive refractive power, respectively, in that order (lenses L4, L5 and L6), a single lens having a positive refractive power (lens L7)

and a three-piece cemented lens CL 3 having a positive, negative and positive refractive power, respectively, in that order (lenses L8, L9 and L10), in order from the object side. Therefore, the second lens group LG2 includes two cemented lenses.

The second lens group LG2 corrects a chromatic aberration, using the three-piece cemented lens CL2 having a positive, negative and positive refractive power, respectively, in that order. In order to secure a wider observation range, as exemplified in the objective 1, the second lens group LG2 comprises the three-piece cemented lens CL3 having a positive, negative and positive refractive power, respectively, in that order, after the three-piece cemented lens CL2 and the positive refractive lens L7 in that order. This is because, even though in order to secure a wider observation range it is effective to correct a curvature aberration by increasing the ray height, it becomes difficult to correct a chromatic aberration when the ray height is increased. A curvature aberration can be easily corrected while a chromatic aberration is corrected by using two three-piece cemented lenses having a positive, negative and positive refractive power, respectively, in that order, and using the positive refractive lens L7 disposed between the two three-piece cemented lenses, compared with a case where there is only one such three-piece cemented lens.

The various data in this preferred embodiment will be described below.

The focal length f, magnification p, numerical aperture NAob on the object side, and working distance d0 of the objective 1 in this preferred embodiment are as follows.

f=6 mm
β=30
NAob=1.1
d0=0.53 mm

The thickness dc, refractive index nc, and Abbe number vc of the cover glass CG exemplified in FIG. 1 are also as follows.

dc=0.17 mm
nc=1.521
vc=43.1

It is also assumed that the surface number of an object surface (surface on the object side of the cover glass CG) and the surface number of the surface on an image side of the cover glass CG are S1 and S2, respectively. In this case, the refractive index n and Abbe number v of an immersion liquid with which the area between the surface with surface number S2 and the surface with surface number S3 nearest the object side of the first lens group is filled are as follows.

n=1.4041
v=51.9

The lens data of the objective 1 in this preferred embodiment is as follows, where "s" represents the surface number, "r" represents the curvature radius (mm), "ld" represents the space or thickness of a lens (mm), "nd" represents the refraction index with respect to the d line, and "vd" represents the Abbe number with respect to the d line.

Objective 1

| S | r(mm) | ld(mm) | nd | vd |
|---|---|---|---|---|
| S3 | INF | 0.6500 | 1.45853 | 67.94 |
| S4 | −1.1000 | 3.4320 | 1.88300 | 40.76 |
| S5 | −3.8703 | 0.2000 | 1.0 | |
| S6 | −24.9639 | 2.5473 | 1.88300 | 40.76 |
| S7 | −8.2576 | 0.6597 | 1.0 | |

-continued

| S | r(mm) | ld(mm) | nd | vd |
|---|---|---|---|---|
| S8 | 78.9980 | 4.7774 | 1.43875 | 94.93 |
| S9 | −8.1850 | 1.0000 | 1.63775 | 42.41 |
| S10 | 27.2882 | 5.8398 | 1.49700 | 81.14 |
| S11 | −11.7598 | 0.7162 | 1.0 | |
| S12 | 185.7713 | 2.2110 | 1.56907 | 71.30 |
| S13 | −32.7117 | 0.2000 | 1.0 | |
| S14 | 33.6380 | 2.3080 | 1.49700 | 81.14 |
| S15 | −84.6921 | 1.0000 | 1.63775 | 42.41 |
| S16 | 8.9124 | 6.1311 | 1.43875 | 94.93 |
| S17 | −25.3110 | 0.2000 | 1.0 | |
| S18 | 7.3586 | 5.2473 | 1.49700 | 81.14 |
| S19 | 107.1912 | 1.0800 | 1.88300 | 40.76 |
| S20 | 5.9114 | 4.7000 | 1.0 | |
| S21 | −5.3940 | 3.0026 | 1.48749 | 70.23 |
| S22 | −16.6948 | 3.0000 | 1.73800 | 32.26 |
| S23 | −8.9225 | | | |

In the above data, the surface with surface number S3 in the objective 1 is the lens surface nearest the object side of the objective 1. The space or thickness of a lens with surface number S3 indicates a space or thickness between the surfaces with surface numbers S3 and S4. The refractive index at the d-line of a lens with surface number S3 indicates the refractive index at the d-line of a medium between the surfaces with surface numbers S3 and S4. The Abbe number at the d-line of the lens with surface number S3 indicates the Abbe number at a medium between the surfaces with surface numbers S3 and S4.

The objective 1 in this preferred embodiment satisfies conditions (1) through (11) as illustrated by the following expressions (A1) through (A11). Expressions (A1) through (A11) correspond to conditions (1) through (11), respectively. For ny and vy, the refractive index and Abbe number, respectively, of the lens L4 are used.

$$n1=1.8830 \quad (A1)$$

$$NAob=1.1 \quad (A2)$$

$$NAob*d0=1.1*0.53=0.583 \quad (A3)$$

$$NAob/\beta=1.1/30 \cong 0.0367 \quad (A4)$$

$$f2a/f2b=44.666/111.882 \cong 0.399 \quad (A5)$$

$$|nx-ny|=|1.497-1.63775|=0.199 \quad (A6)$$

$$|vx-vy|=|42.41-94.93|=52.52 \quad (A7)$$

$$d1/d=6.8293/48.9024 \cong 0.140 \quad (A8)$$

$$fm/fs=-4.1531/13.0417 \cong -0.318 \quad (A9)$$

$$fs/ds=13.0417/2.5473 \cong 5.120 \quad (A10)$$

$$Rmob/Rmim=-1.1/-3.9703 \cong 0.284 \quad (A11)$$

Figure 2:
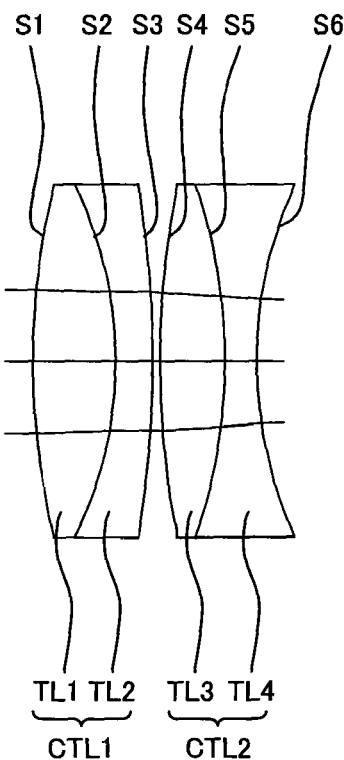
FIG. 2 is a cross-sectional view of a tube lens according to the first preferred embodiment of the present invention.

FIG. 2 is a cross-sectional view of a tube lens according to this preferred embodiment. The tube lens 2 in this preferred embodiment comprises a cemented lens CTL1 composed of lenses TL1 and TL2 and a cemented lens CTL2 composed of lenses TL3 and TL4 as exemplified in FIG. 2.

The lens data of the tube lens 2 in this preferred embodiment is as follows, where "s" represents the surface number, "r" represents the curvature radius (mm), "ld" represents the space or thickness of a lens (mm), "nd" represents the refraction index with respect to the d line, and "vd" represents the Abbe number with respect to the d line.

Objective 1

| S | r(mm) | ld(mm) | nd | vd |
|---|---|---|---|---|
| S1 | 68.7541 | 7.7321 | 1.48749 | 70.21 |
| S2 | −37.5679 | 3.4742 | 1.80610 | 40.95 |
| S3 | −102.8477 | 0.6973 | 1.0 | |
| S4 | 84.3099 | 6.0238 | 1.83400 | 37.17 |
| S5 | −50.7100 | 3.0298 | 1.64450 | 40.82 |
| S6 | 40.6619 | | | |

In the tube lens 2, surface numbers S1 and S6 indicate lens surfaces nearest the object and image sides, respectively. The space or thickness of a lens with surface number S1 indicates the space or thickness between surfaces with surface numbers S1 and S2. The refractive index at the d-line of a lens with surface number S1 indicates the refractive index at the d-line of a medium between the surfaces with surface numbers S1 and S2. The Abbe number at the d-line of a lens with surface number S1 indicates the Abbe number at a medium between the surfaces with surface numbers S1 and S2.

Figure 3:
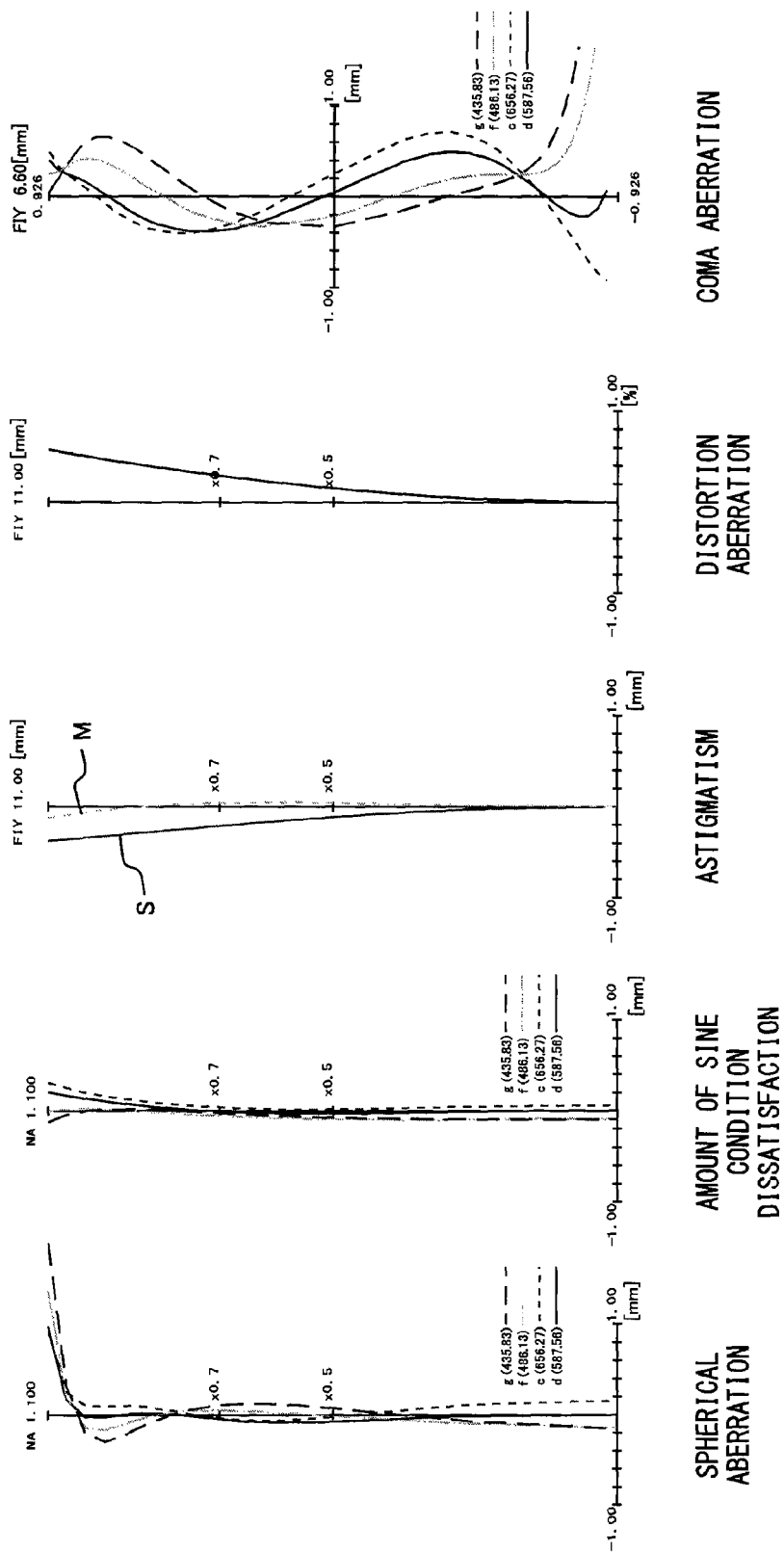
FIG. 3 illustrates the various types of aberrations in an immersion microscope objective according to the first preferred embodiment of the present invention.

FIG. 3 illustrates an aberration in the case where the objective 1 and tube lens 2 according to this preferred embodiment are combined and used and illustrates an aberration on the imaging surface on the image side. The space between the last surface of the objective 1 and the first surface of the tube lens 2 is 114.507 mm. FIG. 3 illustrates spherical aberration, the amount of sine condition dissatisfaction, astigmatism, distortion aberration, and coma aberration. All of them are effectively corrected. "NA" and "FIT" in FIG. 3 are the numerical aperture on the object side of the objective 1 and image height, respectively. "M" and "S" indicate a meridional component and a sagittal component, respectively.

Second Embodiment

FIG. 4 is a cross-sectional view of an immersion microscope objective according to this preferred embodiment. An objective 3 comprises a first lens group LG1 having a positive refractive power, a second lens group LG2 having a positive refractive power, and a third lens group LG3 having a negative refractive power, in order from the object side.

Firstly, only the points that are different from the objective 1 in the structures and operations of respective lens groups will be explained.

The objective 3 differs from the objective 1 in the structure of the first lens group LG1. The objective 3 comprises two single lenses having a positive refractive power (lenses L3 and L4) on the image side of a cemented lens CL1. These positive refractive single lenses function to suppress the ray height of divergent light emitted from a meniscus lens L2 and to correct high-order spherical and coma aberrations in the same way as the objective 1. The objective 3 increases the number of surfaces by providing a plurality of positive refractive single lenses. Thus, the objective 3 suppresses the ray height by gradually refracting divergent light from the meniscus lens L2 on respective surfaces. Therefore, the objective 3 is advantageous compared with the objective 1, from the viewpoint of aberration correction.

Since the rest of the structure and the other functions of the objective 3 are the same as those of the objective 1, their explanations are omitted.

The various data in this preferred embodiment will be described below.

The focal length f, magnification β, numerical aperture NAob on the object side, and working distance d0 of the objective 3 in this preferred embodiment are as follows.

f=6 mm
β=30
NAob=1.1
d0=0.53 mm

The thickness dc, refractive index nc, and Abbe number vc of the cover glass CG exemplified in FIG. 4 are as follows and are the same as those of the first preferred embodiment.

dc=0.17 mm
nc=1.521
vc=43.1

The refractive index n and Abbe number v of immersion liquid with which the area between the surface with surface number S2 on the image side of the cover glass CG and the surface with surface number S3 nearest the object side of the first lens group is filled are as follows and are the same as those of the first preferred embodiment.

n=1.4041
v=51.9

The lens data of the objective 3 in this preferred embodiment is as follows.

Objective 3

| S | r(mm) | ld(mm) | nd | vd |
|---|---|---|---|---|
| S3 | INF | 0.6500 | 1.45853 | 67.94 |
| S4 | −1.1000 | 3.3641 | 1.88300 | 40.76 |
| S5 | −3.7024 | 0.2000 | 1.0 | |
| S6 | −26.7839 | 2.0602 | 1.49700 | 81.54 |
| S7 | −9.4404 | 0.1000 | 1.0 | |
| S8 | −35.0623 | 1.9108 | 1.88300 | 40.76 |
| S9 | −13.0686 | 1.3419 | 1.0 | |
| S10 | −209.0473 | 3.4477 | 1.43875 | 94.93 |
| S11 | −11.2987 | 1.0000 | 1.63775 | 42.41 |
| S12 | 20.1184 | 6.2392 | 1.49700 | 81.54 |
| S13 | −12.7936 | 0.1000 | 1.0 | |
| S14 | 1.144 * 10$^4$ | 1.8662 | 1.56907 | 71.30 |
| S15 | −35.0299 | 0.2000 | 1.0 | |
| S16 | 33.6406 | 1.8147 | 1.49700 | 81.54 |
| S17 | INF | 1.0000 | 1.63775 | 42.41 |
| S18 | 9.8394 | 6.0467 | 1.43875 | 94.93 |
| S19 | −23.6759 | 0.2000 | 1.0 | |
| S20 | 7.4253 | 5.2663 | 1.49700 | 81.54 |
| S21 | 129.2745 | 1.0800 | 1.88300 | 40.76 |
| S22 | 5.8004 | 4.7000 | 1.0 | |
| S23 | −5.2670 | 2.6098 | 1.48749 | 70.23 |
| S24 | −14.0266 | 3.6929 | 1.73800 | 32.26 |
| S25 | −8.9289 | | | |

In the objective 3, a surface with surface number S3 indicates a lens surface nearest the object side of the objective 3. The space or thickness of a lens with surface number S3 indicates the space or thickness between the surfaces with surface numbers S3 and S4. The refractive index at the d-line of a lens with surface number S3 indicates the refractive index at the d-line of a medium between the surfaces with surface numbers S3 and S4. The Abbe number at the d-line of the lens of surface number S3 indicates the Abbe number at a medium between the surfaces with surface numbers S3 and S4.

The objective 3 in this preferred embodiment satisfies conditions (1) through (11) as illustrated in the following expressions (B1) through (B11). Expressions (B1) through (B11) correspond to conditions (1) through (11), respectively. For ny and vy, the refractive index and Abbe number, respectively, of the lens L5 are used.

n1=1.8830 (B1)

NAob=1.1 (B2)

$NAob*d0=1.1*0.53=0.583$ (B3)

$NAob/\beta=1.1/30\cong0.0367$ (B4)

$f2a/f2b=58.982/74.029\cong0.797$ (B5)

$|nx-ny|=11.497-1.637751=0.199$ (B6)

$|vx-vy|=142.41-94.931=52.52$ (B7)

$d1/d=8.2851/48.8905\cong0.1695$ (B8)

$fm/fs=-4.5004/12.8067\cong0.3514$ (B9)

$fs/ds=12.8067/4.071\cong3.146$ (B10)

$Rmob/Rmim=-1.1/-3.7024\cong0.297$ (B11)

The objective 3 includes a plurality of positive refractive single lenses in the first lens group LG1. Therefore, in this preferred embodiment, n1 is the refractive index at the d-line of a single lens (lens L4) having the highest refractive index in single lenses included in the first lens group LG1. ds is the summed total length of a single lens group (lenses L3 and L4) included in the first lens group LG1. fs is the composite focal length of a single lens group (lenses L3 and L4) included in the first lens group LG1.

Figure 5:
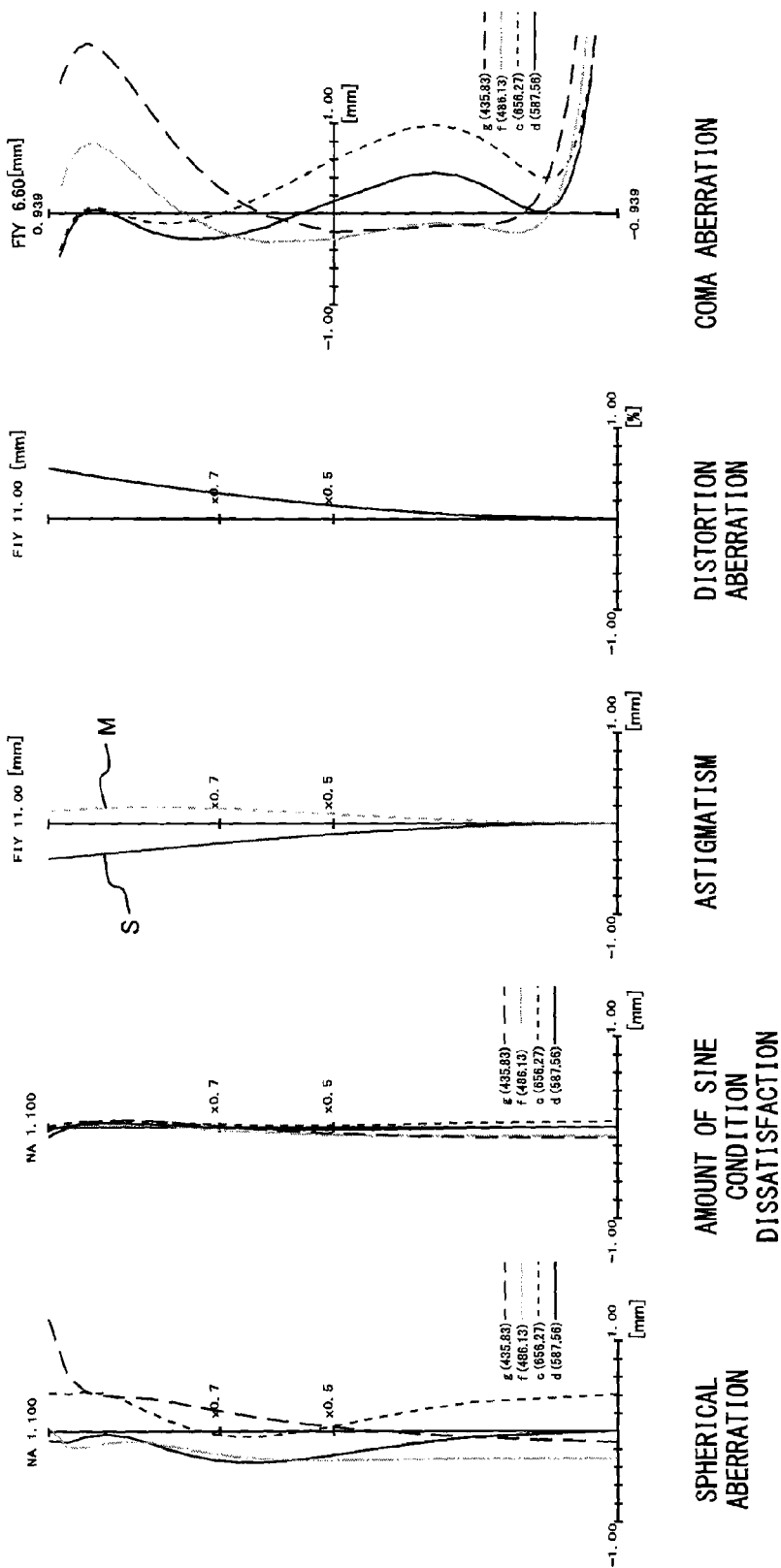
FIG. 5 illustrates the various types of aberrations in an immersion microscope objective according to the second preferred embodiment of the present invention.

FIG. 5 illustrates aberrations on the imaging surface on the image side in the case where the objective 3 and tube lens 2 according to this preferred embodiment are combined and used. The tube lens 2 is the same as that of the first preferred embodiment. The space between the objective 3 and tube lens 2 is also the same as that of the first preferred embodiment. FIG. 5 illustrates spherical aberration, the amount of sine condition dissatisfaction, astigmatism, distortion aberration, and coma aberration. All of them are effectively corrected. "NA" and "FIT" in FIG. 5 are the numerical aperture on the object side of the objective 3 and image height (mm), respectively. "M" and "S" indicate a meridional component and a sagittal component, respectively.

Third Embodiment

FIG. 6 is a cross-sectional view of an immersion microscope objective according to this preferred embodiment. An objective 4 comprises a first lens group having a positive refractive power, a second lens group LG2 having a positive refractive power, and a third lens group LG3 having a negative refractive power, in order from the object side.

Firstly, only the different points from the objective 1 in the structures and operations of respective lens groups will be explained.

The objective 4 differs from the objective 1 in the structure of the second lens group LG2. In the objective 4, the second lens group LG2 comprises a first three-piece cemented lens (cemented lens CL2), a second three-piece cemented lens (cemented lens CL3), and a cemented lens having a positive refractive (cemented lens CL4) in order from the object side. In this case, the cemented lens CL2 is composed of lenses having a positive, negative, positive refractive power, respectively, which is composed of a biconvex lens, a biconcave lens, and a biconvex lens. The cemented lens CL3 is composed of a lens having a negative-positive-negative refractive power, which is composed of a meniscus lens whose convex surface faces the object side, a biconvex lens, and a meniscus lens whose concave surface faces the object side. The cemented lens CL4 is composed of a biconvex lens and a biconcave lens.

The second lens group LG2 in this preferred embodiment corrects a chromatic aberration using the three-piece cemented lenses. In order to secure a larger numerical aperture, the second lens group LG2 comprises two three-piece cemented lenses and a cemented lens having a positive refractive power, as exemplified in the objective 4. Thus, the objective 4 can secure a larger numerical aperture while correcting a chromatic aberration than the objective 1.

Since the rest of the structure and the other functions of the objective 4 are the same as those of the objective 1, their explanations are omitted.

The various data in this preferred embodiment will be described below.

The focal length f, magnification $\beta$, numerical aperture NAob on the object side, and working distance d0 of the objective 4 in this preferred embodiment are as follows.

f=4.5 mm
$\beta$=40
NAob=1.2
d0=0.53 mm

The thickness dc, refractive index nc, and Abbe number vc of the cover glass CG exemplified in FIG. 6 are as follows and are the same as those of the first preferred embodiment.

dc=0.17 mm
nc=1.521
vc=43.1

The refractive index n and Abbe number v of the immersion liquid with which the area between the surface with surface number S2 on the image side of the cover glass CG and the surface with surface number S3 nearest the object side of the first lens group is filled are as follows and are the same as those of the first preferred embodiment.

n=1.4041
v=51.9

The lens data of the objective 4 in this preferred embodiment is as follows.

Objective 4

| S | r(mm) | ld(mm) | nd | vd |
|---|---|---|---|---|
| S3 | INF | 0.7800 | 1.45853 | 67.94 |
| S4 | -1.2300 | 3.1723 | 1.88300 | 40.76 |
| S5 | -3.5912 | 0.2000 | 1.0 | |
| S6 | -10.0427 | 3.0850 | 1.77250 | 49.60 |
| S7 | -6.3452 | 0.6536 | 1.0 | |
| S8 | 16.5640 | 5.8848 | 1.43875 | 94.93 |
| S9 | -9.5162 | 1.0000 | 1.63775 | 42.41 |
| S10 | 164.2657 | 3.6800 | 1.49700 | 81.54 |
| S11 | -13.5772 | 0.6538 | 1.0 | |
| S12 | 32.0095 | 1.3500 | 1.67300 | 38.15 |
| S13 | 15.4055 | 4.5620 | 1.43875 | 94.93 |
| S14 | -17.1827 | 1.2500 | 1.67300 | 38.15 |
| S15 | -222.3600 | 0.2000 | 1.0 | |
| S16 | 15.4648 | 5.0932 | 1.49700 | 81.54 |
| S17 | -12.8589 | 1.2500 | 1.61336 | 44.49 |
| S18 | 96.2027 | 0.2000 | 1.0 | |
| S19 | 7.0776 | 5.1973 | 1.49700 | 81.54 |
| S20 | -25.4238 | 1.0000 | 1.63775 | 42.41 |
| S21 | 4.6553 | 4.1500 | 1.0 | |
| S22 | -4.2797 | 2.5433 | 1.48749 | 70.23 |
| S23 | -23.0133 | 2.8221 | 1.73800 | 32.26 |
| S24 | -8.0309 | | | |

In the objective 4, a surface with surface number S3 indicates a lens surface nearest the object side of the objective 4. The space or thickness of a lens with surface number S3 indicates the space or thickness between the surfaces with surface numbers S3 and S4. The refractive index at the d-line of a lens with surface number S3 indicates the refractive index at the d-line of a medium between the surfaces with surface numbers S3 and S4. The Abbe number at the d-line of the lens of surface number S3 indicates the Abbe number at a medium between the surfaces with surface numbers S3 and S4.

The objective 4 in this preferred embodiment satisfies conditions (1) through (4) and (8) through (11), as illustrated in the following expressions (C1) through (C4) and (C8) through (C11). Expressions (C1) through (C4) and (C8) through (C11) correspond to conditions (1) through (4) and (8) through (11), respectively.

$$n1=1.7725 \tag{C1}$$

$$NAob=1.2 \tag{C2}$$

$$NAob*d0=1.2*0.53=0.636 \tag{C3}$$

$$NAob/\beta=1.2/40=0.03 \tag{C4}$$

$$d1/d=7.2373/48.7274 \cong 0.1485 \tag{C8}$$

$$fm/fs=-5.7251/16.3606 \cong -0.350 \tag{C9}$$

$$fs/ds=16.3606/3.0850 \cong 5.303 \tag{C10}$$

$$Rmob/Rmim=-1.23/-3.5912 \cong 0.343 \tag{C11}$$

Figure 7:
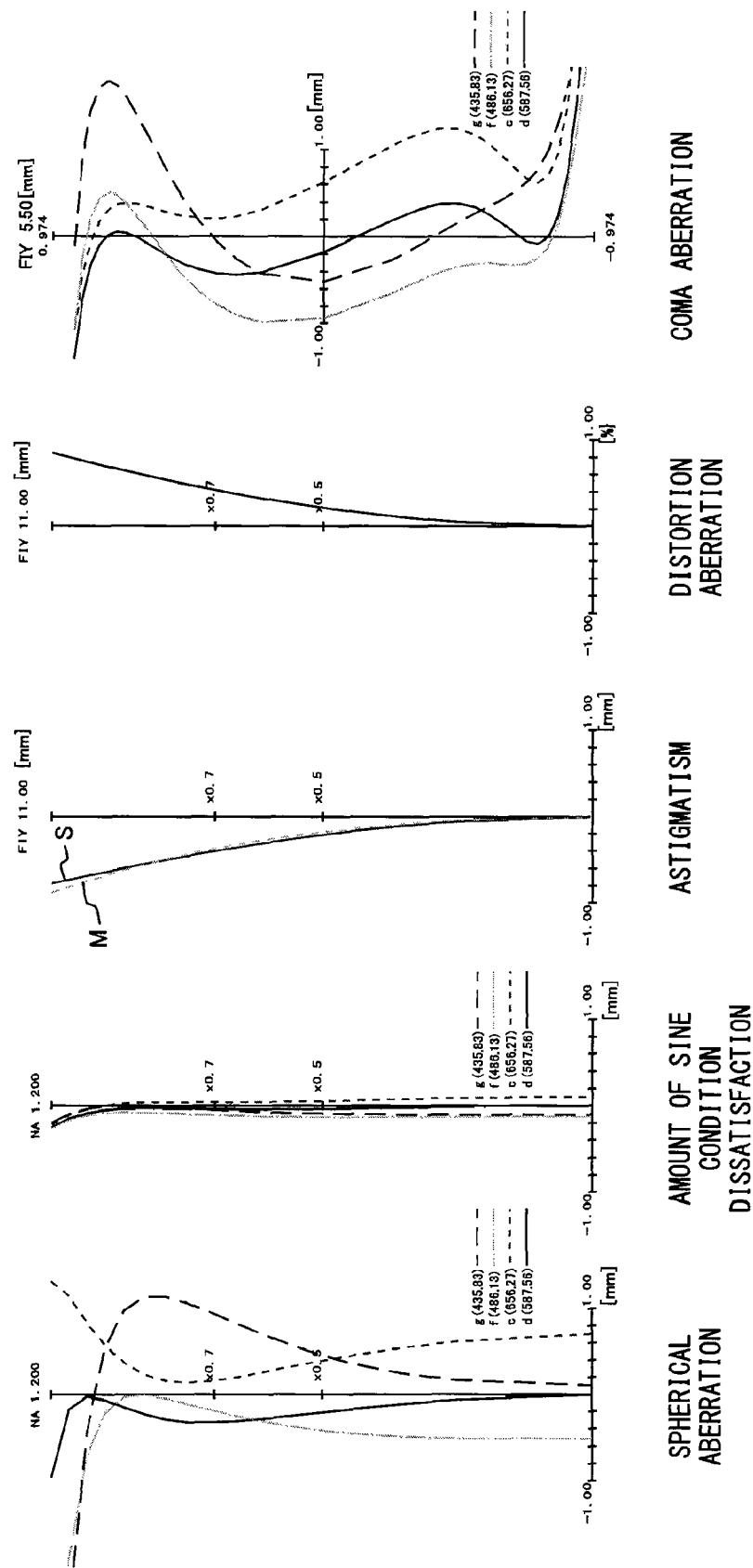
FIG. 7 illustrates the various types of aberrations in an immersion microscope objective according to the third preferred embodiment of the present invention.

FIG. 7 illustrates aberrations on the imaging surface on the image side in the case where an objective 4 and a tube lens 2 according to this preferred embodiment are combined and used. The tube lens 2 is the same as that of the first preferred embodiment. The space between the objective 4 and tube lens 2 is also the same as that of the first preferred embodiment. FIG. 7 illustrates spherical aberration, the amount of sine condition dissatisfaction, astigmatism, distortion aberration and coma aberration. All of them are effectively corrected. "NA" and "FIT" in FIG. 5 are the numerical aperture on the object side of the objective 4 and image height (mm), respectively. "M" and "S" indicate a meridional component and a sagittal component, respectively.

Fourth Embodiment

Figure 8:
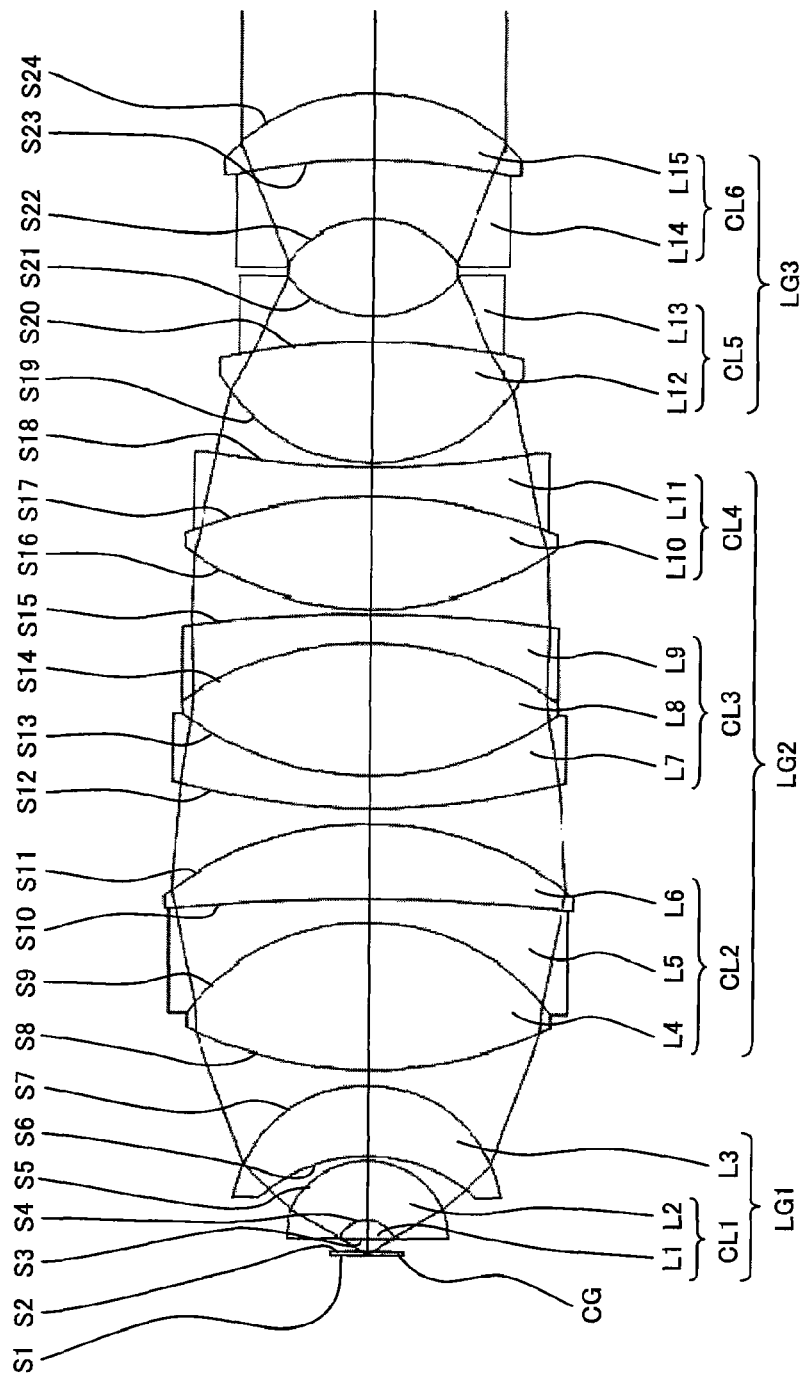
FIG. 8 is a cross-sectional view of an immersion microscope objective according to the fourth preferred embodiment of the present invention.

FIG. 8 is a cross-sectional view of an immersion microscope objective according to this preferred embodiment.

An objective 5 comprises a first lens group LG1 having a positive refractive power, a second lens group LG2 having a positive refractive power, and a third lens group LG3 having a negative refractive power, in order from the object side.

Since the structure and functions of the objective 5 are the same as those of the objective 4, their explanations are omitted.

The various data in this preferred embodiment will be described below.

The focal length f, magnification β, numerical aperture NAob on the object side and working distance d0 of the objective 5 in this preferred embodiment are as follows.
  f=4.5 mm
  β=40
  NAob=1.2
  d0=0.53 mm The thickness dc, refractive index nc and Abbe number vc of the cover glass CG exemplified in FIG. 8 are as follows and are the same as those of the first preferred embodiment.
  dc=0.17 mm
  nc=1.521
  vc=43.1
the refractive index n and Abbe number v of an immersion liquid with which the area between the surface with surface number S2 and the surface with surface number S3 nearest the object side of the first lens group is filled are as follows and are the same as those of the first preferred embodiment.
  n=1.4041
  v=51.9

The lens data of the objective 5 in this preferred embodiment is as follows.

Objective 5

| S | r(mm) | ld(mm) | nd | vd |
|---|---|---|---|---|
| S3 | INF | 0.7800 | 1.45853 | 67.94 |
| S4 | −1.2300 | 2.5723 | 1.88300 | 40.76 |
| S5 | −3.2779 | 0.2000 | 1.0 | |
| S6 | −6.3375 | 2.9707 | 1.88300 | 40.76 |
| S7 | −5.4843 | 0.6755 | 1.0 | |
| S8 | 16.3821 | 6.2969 | 1.43875 | 94.93 |
| S9 | −8.9178 | 1.0000 | 1.63775 | 42.41 |
| S10 | −72.2472 | 3.2006 | 1.49700 | 81.54 |
| S11 | −12.7896 | 0.6724 | 1.0 | |
| S12 | 28.6445 | 1.3500 | 1.67300 | 38.15 |
| S13 | 12.3206 | 5.6705 | 1.43875 | 94.93 |
| S14 | −12.9574 | 1.2500 | 1.67300 | 38.15 |
| S15 | −52.3193 | 0.2000 | 1.0 | |
| S16 | 12.2853 | 4.7808 | 1.49700 | 81.54 |
| S17 | −18.9635 | 1.2500 | 1.61336 | 44.49 |
| S18 | 34.3361 | 0.2000 | 1.0 | |
| S19 | 7.0120 | 5.1755 | 1.49700 | 81.54 |
| S20 | −25.7061 | 1.0000 | 1.63775 | 42.41 |
| S21 | 4.4378 | 4.1500 | 1.0 | |
| S22 | −4.1408 | 2.5478 | 1.48749 | 70.23 |
| S23 | −23.3946 | 2.8248 | 1.73800 | 32.26 |
| S24 | −7.8832 | | | |

In the objective 5, a surface with surface number S3 indicates a lens surface nearest the object side of the objective 5. The space or thickness of a lens with surface number S3 indicates the space or thickness between the surfaces with surface numbers S3 and S4. The refractive index at the d-line of a lens with surface number S3 indicates the refractive index at the d-line of a medium between the surfaces with surface numbers S3 and S4. The Abbe number at the d-line of the lens of surface number S3 indicates the Abbe number at a medium between the surfaces with surface numbers S3 and S4.

The objective 5 in this preferred embodiment satisfies conditions (1) through (4) and (8) through (11), as illustrated in the following expressions (D1) through (D4) and (D8) through (D11). The expressions (D1) through (D4) and (D8) through (D11) correspond to conditions (1) through (4) and (8) through (11), respectively.

$$n1=1.8830 \tag{D1}$$

$$NAob=1.2 \tag{D2}$$

$$NAob*d0=1.2*0.53=0.636 \tag{D3}$$

$$NAob/\beta=1.2/40=0.03 \tag{D4}$$

$$d1/d=6.523/48.7678 \cong 0.1338 \tag{D8}$$

$$fm/fs=-5.4248/17.5235 \cong -0.3096 \tag{D9}$$

$$fs/ds=17.5235/2.9707 \cong 5.899 \tag{D10}$$

$$Rmob/Rmim=-1.23/-3.2779 \cong 0.375 \tag{D11}$$

Figure 9:
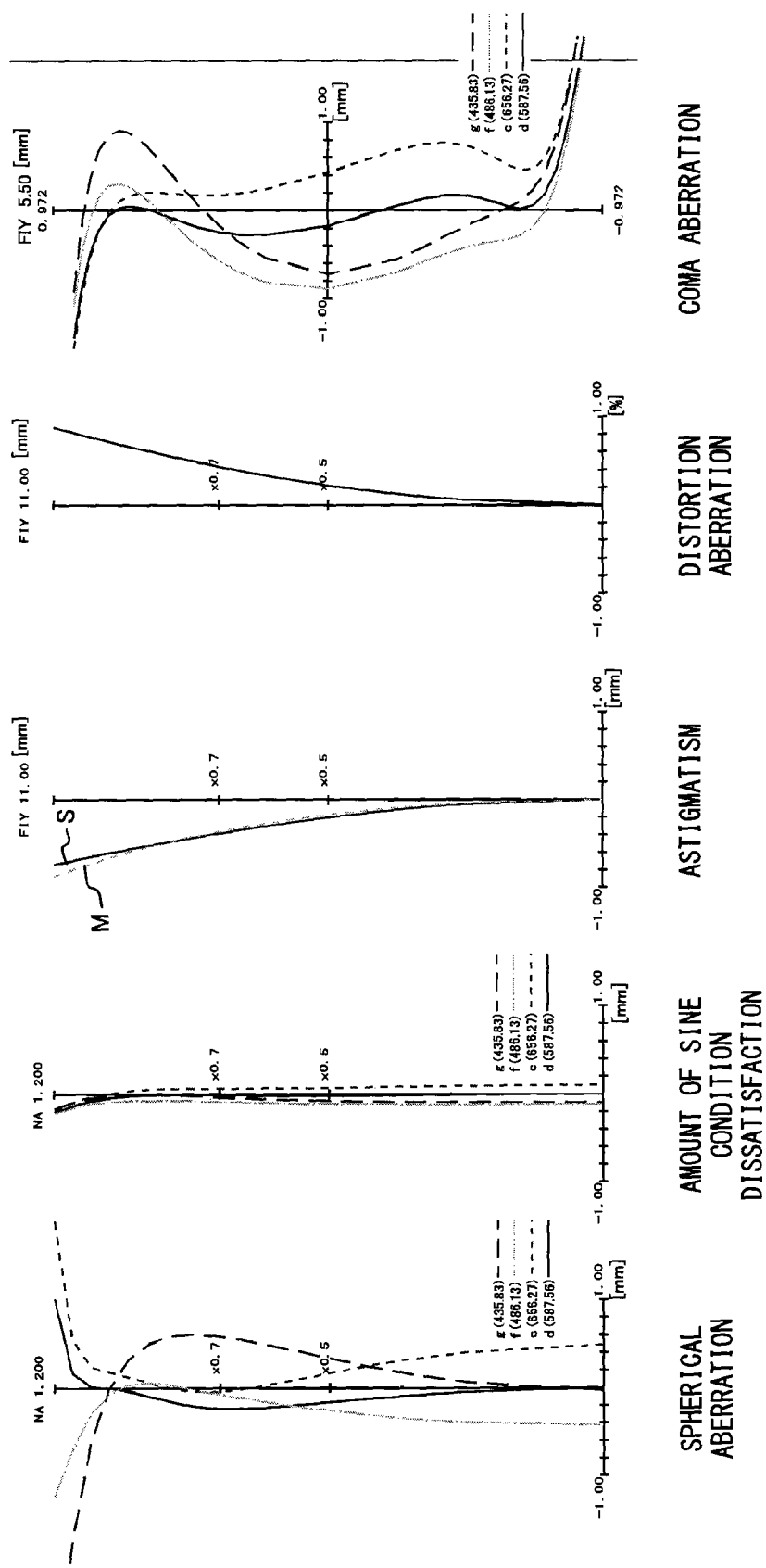
FIG. 9 illustrates the various types of aberrations in an immersion microscope objective according to the fourth preferred embodiment of the present invention.

FIG. 9 illustrates aberrations on the imaging surface on the image side in the case where an objective 5 and a tube lens 2 according to this preferred embodiment are combined and used. The tube lens 2 is the same as that of the first preferred embodiment. The space between the objective 5 and tube lens 2 is also the same as that of the first preferred embodiment. FIG. 9 illustrates spherical aberration, the amount of sine condition dissatisfaction, astigmatism, distortion aberration and coma aberration. All of them are effectively corrected. "NA" and "FIT" in FIG. 9 are the numerical aperture on the object side of the objective 5 and image height (mm), respectively. "M" and "S" indicate a meridional component and a sagittal component, respectively.

Fifth Embodiment

Figure 10:
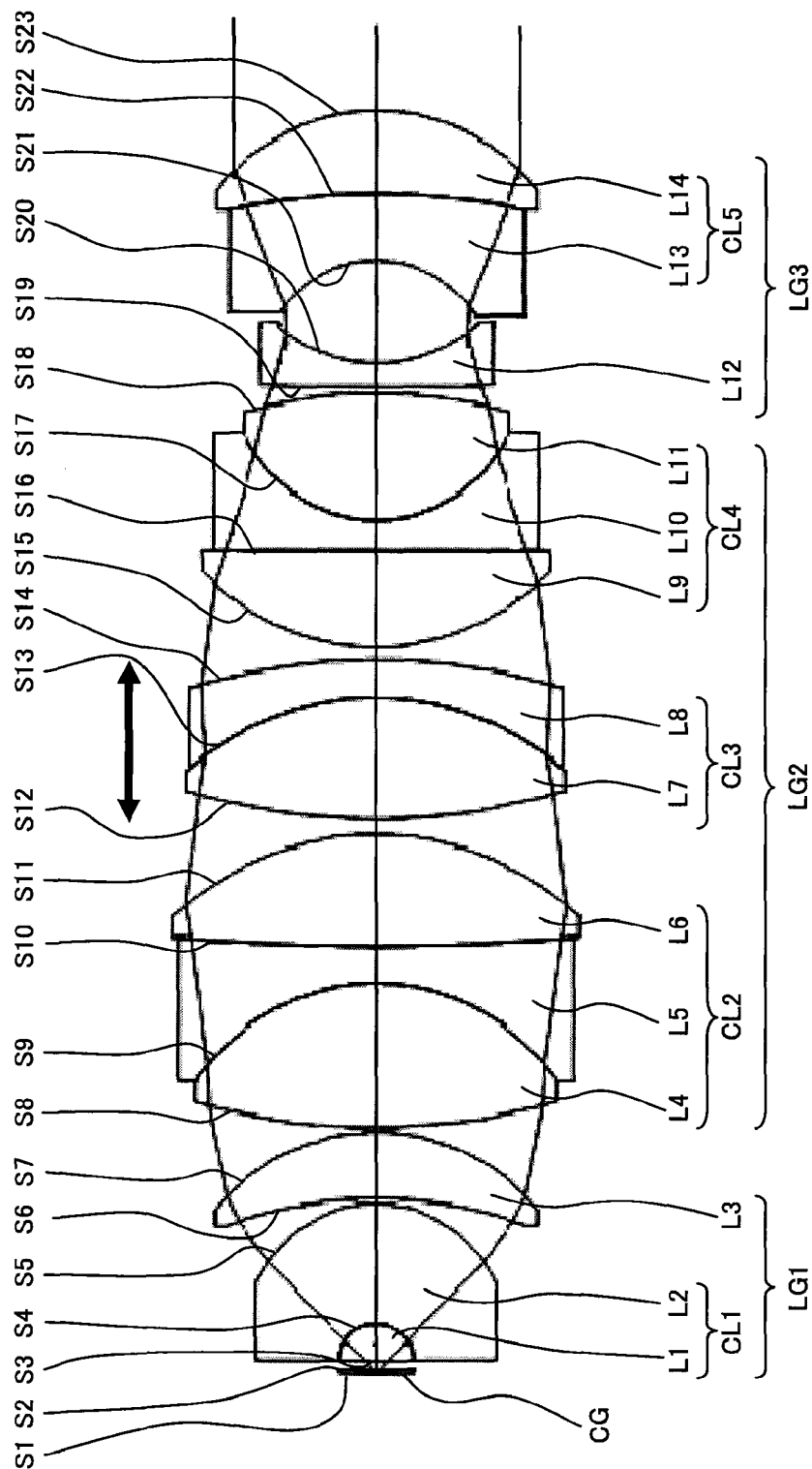
FIG. 10 is a cross-sectional view of an immersion microscope objective according to the fifth preferred embodiment of the present invention.

FIG. 10 is a cross-sectional view of an immersion microscope objective according to this preferred embodiment. An objective 6 comprises a first lens group LG1 having a positive refractive power, a second lens group LG2 having a positive refractive power and a third lens group LG3 having a negative refractive power, in order from the object side.

Firstly, only the different points from the objective 1 of the structures and functions of respective lens groups of an objective 6 will be explained. The objective 6 differs from the objective 1 in the structures of the second and third lens groups LG2 and LG3, respectively.

The second lens group LG2 comprises a first three-piece cemented lens (cemented lens CL2), a two-piece cemented lens movable along the optical axis (cemented lens CL3), and a second three-piece cemented lens (cemented lens CL4). In this case, the cemented lens CL2 is composed of lenses having a positive, negative, positive refractive power, respectively, which is composed of a biconvex lens, a biconcave lens, and a biconvex lens. The cemented lens CL3 is composed of a biconvex lens and a meniscus lens whose concave surface faces the object side. The cemented lens CL4 is composed of lenses having a positive, negative, positive refractive power, respectively, which is composed of a biconvex lens element, a biconcave lens element, and a biconvex lens element.

The second lens group LG2 in this preferred embodiment can effectively correct a chromatic aberration using three-piece cemented lenses. Even when the thickness of the cover glass CG has some degree of individual difference, a spherical aberration can be effectively corrected by moving the cemented lens CL3 along the optical axis.

The third lens group LG3 includes a Gaussian type lens structure composed of a single lens (lens L12) whose concave surface faces the image side and a cemented lens (cemented lens CL5) whose concave surface faces the object side. In this case, the single lens is a meniscus lens and the cemented lens CL5 is composed of two meniscus lens whose concave surface faces the object side.

In the third lens group LG3 in this preferred embodiment, a Gaussian type lens structure comprises a single lens whose concave surface faces the image side. Therefore, the Gaussian type lens structure can be compactly composed.

Since the rest of the structure and the other functions of the objective 6 are the same as those of the objective 1, their explanations are omitted.

The various data in this preferred embodiment will be described.

The focal length f, magnification p, numerical aperture NAob on the object side and working distance d0 of the objective 6 in this preferred embodiment are as follows. In this case, the working distance d0 indicates the working distance in the case where the cover glass CG has a regulated thickness.

f=6 mm
β=30
NAob=1.1
d0=0.53 mm

The thickness dc, refractive index nc, and Abbe number vc of the cover glass CG exemplified in FIG. 10 are as follows and are the same as those of the first preferred embodiment. Although the thickness dc of the cover glass CG is regulated, it can be changed within a range to be described later.

dc=0.17 mm
nc=1.521
vc=43.1

The refractive index n and Abbe number v of an immersion liquid with which the area between the surface with surface number S2 and the surface with surface number S3 nearest the object side of the first lens group is filled are as follows and are the same as those of the first preferred embodiment.

n=1.4041
v=51.9

The lens data of the objective 6 in this preferred embodiment is as illustrated in the following table.

Objective 6

| S | r(mm) | ld(mm) | nd | vd |
| --- | --- | --- | --- | --- |
| S3 | INF | 0.6500 | 1.45853 | 67.94 |
| S4 | −1.1000 | 3.8091 | 1.88300 | 40.76 |
| S5 | −4.4472 | 0.2000 | | |
| S6 | −12.3870 | 2.8218 | 1.88300 | 40.76 |
| S7 | −7.0114 | 0.2000 | | |
| S8 | 19.0854 | 6.1804 | 1.49700 | 81.14 |
| S9 | −8.9279 | 1.5000 | 1.63775 | 42.41 |
| S10 | 33.9516 | 5.0360 | 1.49700 | 81.14 |
| S11 | −12.4855 | Da | | |
| S12 | 25.7061 | 5.1221 | 1.49700 | 81.14 |
| S13 | −11.0538 | 1.5000 | 1.88300 | 40.76 |
| S14 | −49.4274 | Db | | |
| S15 | 11.9205 | 3.3118 | 1.49700 | 81.14 |
| S16 | −584.6956 | 1.3000 | 1.67300 | 38.15 |
| S17 | 6.9611 | 5.0842 | 1.49700 | 81.14 |
| S18 | −21.8037 | 0.2000 | | |
| S19 | 73.2597 | 1.0000 | 1.63775 | 42.41 |
| S20 | 7.2972 | 4.7000 | | |
| S21 | −5.3646 | 1.7072 | 1.48749 | 70.36 |
| S22 | −21.3531 | 3.4268 | 1.73800 | 32.26 |
| S23 | −8.6488 | | | |

In the objective 6, a surface with surface number S3 indicates a lens surface nearest the object side of the objective 6. The space or thickness of a lens with surface number S3 indicates the space or thickness between the surfaces with surface numbers S3 and S4. The refractive index at the d-line of a lens with surface number S3 indicates the refractive index at the d-line of a medium between the surfaces with surface numbers S3 and S4. The Abbe number at the d-line of the lens of surface number S3 indicates the Abbe number at a medium between the surfaces with surface numbers S3 and S4. Furthermore, the space between surface numbers S11 and S12 and the space between surface numbers S14 and S15 are variable values Da and Db which change according to the movement along the optical axis of the cemented lens CL3.

A relation among the thickness dc of a cover glass, the working distance d0 and the variable values Da and Db is as follows.

Thickness dc of a cover glass, and working distance d0 and surface space

| dc(mm) | d0(mm) | Da(mm) | Db(mm) |
| --- | --- | --- | --- |
| 0.1100 | 0.5849 | 0.5000 | 0.6956 |
| 0.1700 | 0.5300 | 0.6041 | 0.5915 |
| 0.2300 | 0.4750 | 0.6956 | 0.5000 |

The objective 6 in this preferred embodiment satisfies conditions (1) through (13), as illustrated in the following expressions (E1) through (E13). The expressions (E1) through (E13) correspond to conditions (1) through (13), respectively.

$$n1=1.8830 \tag{E1}$$

$$NAob=1.1 \tag{E2}$$

$$NAob*d0=1.1*0.53=0.583 \tag{E3}$$

$$NAob/\beta=1.1/30\approx0.0367 \tag{E4}$$

$$f2a/f2b=23.664/26.491\approx0.893 \tag{E5}$$

$$|nx-ny|=|1.63775-1.49700|=0.1405 \tag{E6}$$

$$|vx-vy|=|42.41-81.14|=38.73 \tag{E7}$$

$$d1/d=7.4809/48.945\approx0.1528 \tag{E8}$$

$$fm/fs=-3.5491/14.683\approx-0.2417 \tag{E9}$$

$$fs/ds=14.683/2.8218\approx5.2034 \tag{E10}$$

$$Rmob/Rmim=-1.10/-4.4472\approx0.2473 \tag{E11}$$

$$|f3a/f3b|=|12.783/127.051|\approx0.1006 \tag{E12}$$

$$|f/f2c|=|6/278.079|\approx0.0216 \tag{E13}$$

Figure 11:
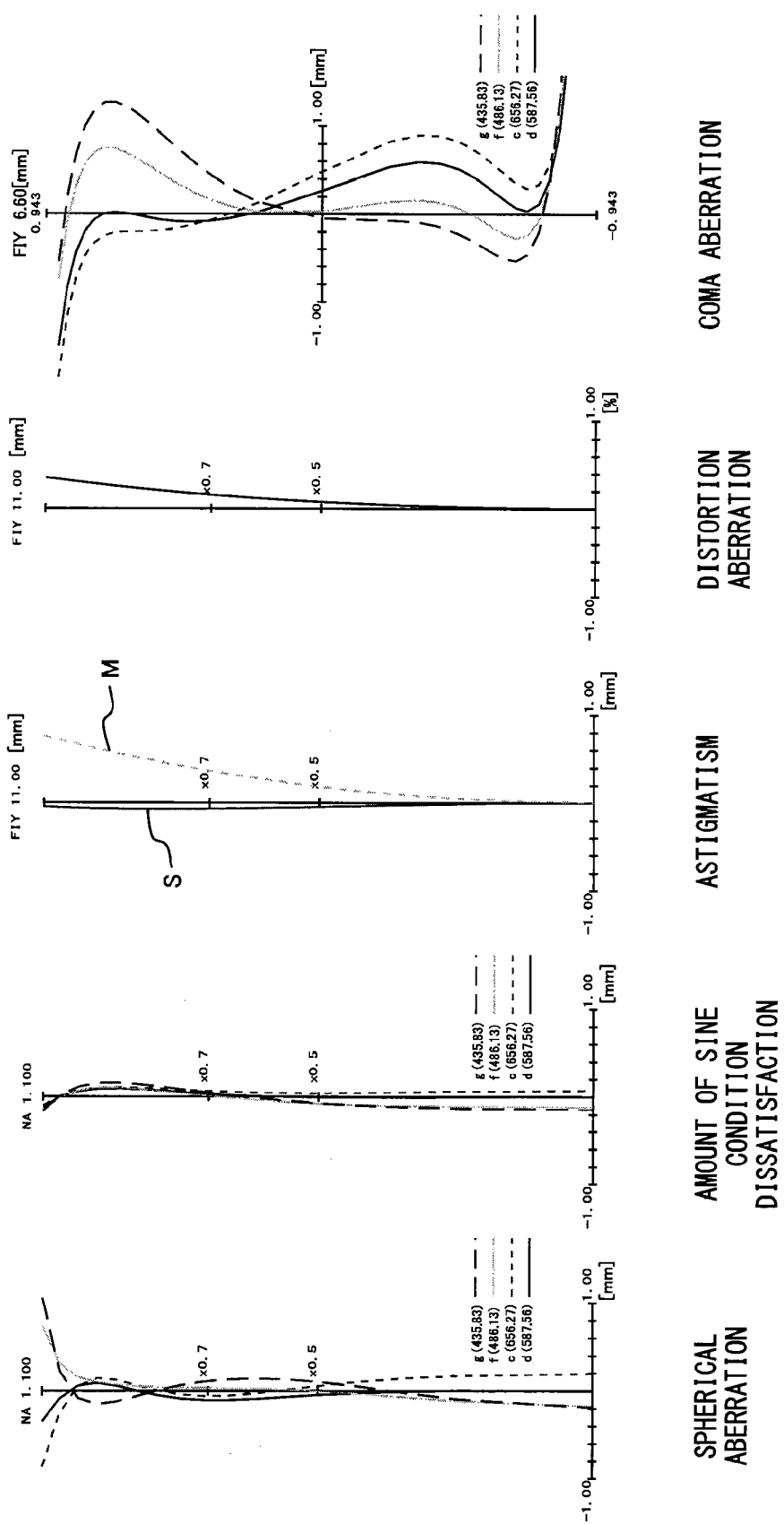
FIG. 11 illustrates the various types of aberrations in an immersion microscope objective according to the fifth preferred embodiment of the present invention.

FIG. 11 illustrates aberrations on the imaging surface on the image side in the case where an objective 6 and a tube lens 2 according to this preferred embodiment are combined and used. The tube lens 2 is the same as that of the first preferred embodiment. The space between the objective 6 and tube lens 2 is also the same as that in the first preferred embodiment. FIG. 11 illustrates spherical aberration, the amount of sine condition dissatisfaction, astigmatism, distortion aberration and coma aberration. All of them are effectively corrected. "NA" and "FIT" in FIG. 11 are the numerical aperture on the object side of the objective 6 and image height (mm), respectively. "M" and "S" indicate a meridional component and a sagittal component, respectively.

Sixth Embodiment

Figure 12:
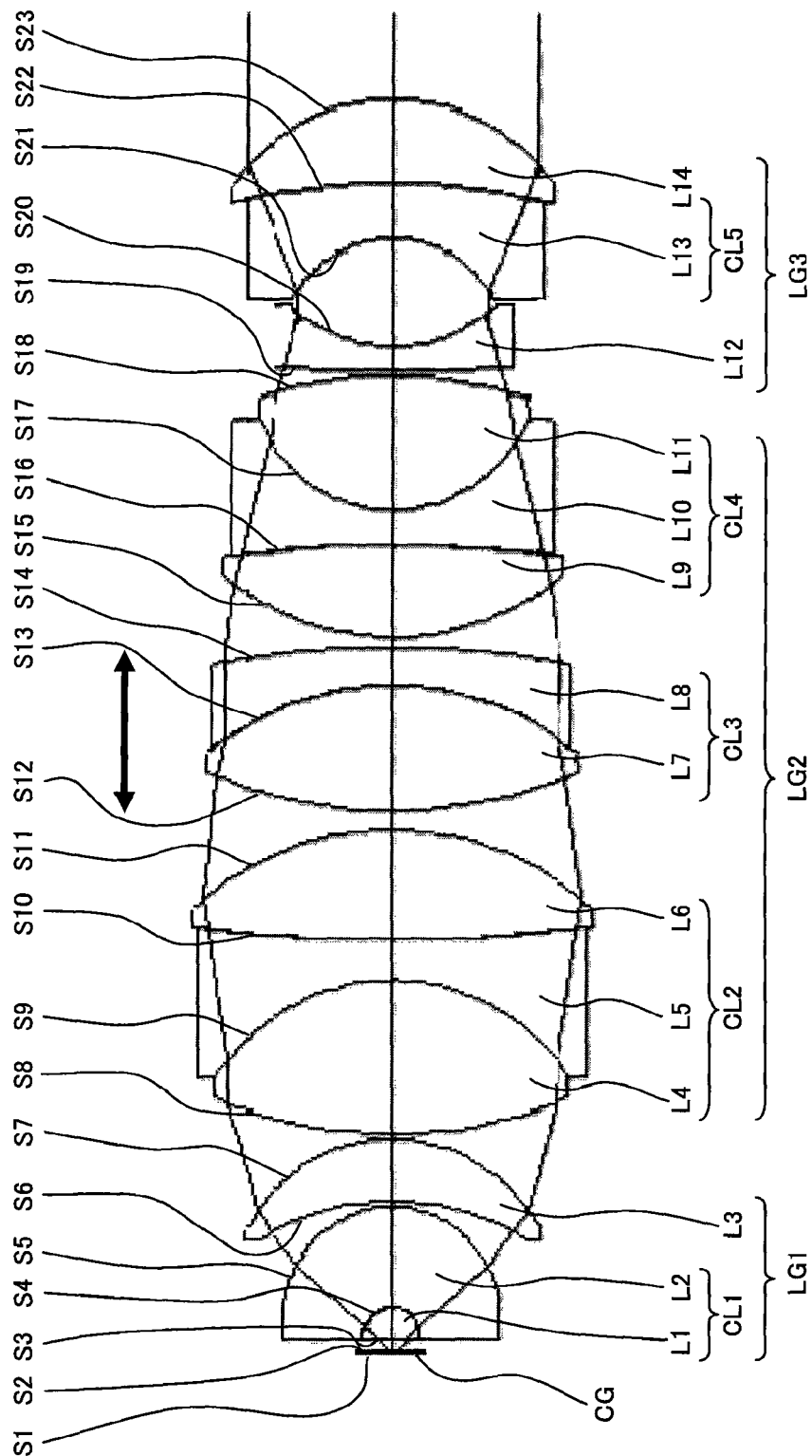
FIG. 12 is a cross-sectional view of an immersion microscope objective according to the sixth preferred embodiment of the present invention.

FIG. 12 is a cross-sectional view of an immersion microscope objective according to this preferred embodiment. An objective 7 comprises a first lens group LG1 having a positive refractive power, a second lens group LG2 having a positive refractive power, and a third lens group LG3 having a negative refractive power, in order from the object side.

Since the structure and functions of the objective 7 are the same as those of the objective 6, their explanations are omitted.

The various data in this preferred embodiment will be described below.

The focal length f, magnification β, numerical aperture NAob on the object side and working distance d0 of the objective 7 in this preferred embodiment are as follows. In this case, the working distance d0 indicates the working distance in the case where the cover glass CG has a regulated thickness.

f=6 mm
β=30
NAob=1.05
d0=0.83 mm

The thickness dc, refractive index nc and Abbe number vc of the cover glass CG exemplified in FIG. 12 are as follows and are the same as those of the first preferred embodiment. Although the thickness dc of the cover glass CG is regulated, it can be changed within a range to be described later.

dc=0.17 mm
nc=1.521
vc=43.1 the refractive index n and Abbe number v of an immersion liquid with which the area between the surface with surface number S2 and the surface with surface number S3 nearest the object side of the first lens group is filled are as follows and are the same as those of the first preferred embodiment.

n=1.4041
v=51.9

The lens data of the objective 7 in this preferred embodiment is as follows.

Objective 7

| S | r(mm) | ld(mm) | nd | vd |
|---|---|---|---|---|
| S3 | INF | 0.8900 | 1.45853 | 67.94 |
| S4 | −1.2750 | 3.9550 | 1.88300 | 40.76 |
| S5 | −4.6928 | 0.2000 | | |
| S6 | −11.2451 | 2.5326 | 1.88300 | 40.76 |
| S7 | −7.1390 | 0.2000 | | |
| S8 | 21.3830 | 6.1003 | 1.49700 | 81.14 |
| S9 | −9.2542 | 1.5400 | 1.63775 | 42.41 |
| S10 | 82.9504 | 4.3913 | 1.49700 | 81.14 |
| S11 | −12.9881 | Da | | |
| S12 | 20.9200 | 5.1041 | 1.43875 | 94.93 |
| S13 | −12.5604 | 1.4300 | 1.88300 | 40.76 |
| S14 | −40.0619 | Db | | |
| S15 | 11.9671 | 3.7120 | 1.49700 | 81.14 |
| S16 | −52.4718 | 1.2600 | 1.63775 | 42.41 |
| S17 | 6.3015 | 5.2847 | 1.49700 | 81.14 |
| S18 | −20.9997 | 0.2000 | | |
| S19 | 87.0768 | 1.0000 | 1.73800 | 32.26 |
| S20 | 6.8475 | 4.3000 | | |
| S21 | −5.0775 | 2.2025 | 1.48749 | 70.36 |
| S22 | −28.0938 | 3.2939 | 1.73800 | 32.26 |
| S23 | −8.5943 | | | |

In the objective 7, a surface with surface number S3 indicates a lens surface nearest the object side of the objective 7. The space or thickness of a lens with surface number S3 indicates the space or thickness between the surfaces with surface numbers S3 and S4. The refractive index at the d-line of a lens with surface number S3 indicates the refractive index at the d-line of a medium between the surfaces with surface numbers S3 and S4. The Abbe number at the d-line of the lens of surface number S3 indicates the Abbe number at a medium between the surfaces with surface numbers S3 and S4. Furthermore, the space between surface numbers S11 and S12 and the space between surface numbers S14 and 515 are variable values Da and Db, respectively, which change according to the movement along the optical axis of the cemented lens CL3.

A relation among the thickness dc of a cover glass, the working distance d0 and the variable values Da and Db is as follows.

Thickness dc of a cover glass, and working distance d0 and surface space Da and Db

| dc(mm) | d0(mm) | Da(mm) | Db(mm) |
|---|---|---|---|
| 0.0700 | 0.9202 | 0.5000 | 0.5636 |
| 0.1700 | 0.8300 | 0.6420 | 0.4216 |
| 0.1900 | 0.8119 | 0.6636 | 0.4000 |

The objective 7 in this preferred embodiment satisfies conditions (1) through (13), as illustrated in the following expressions (F1) through (F13). The expressions (F1) through (F13) correspond to conditions (1) through (13), respectively.

$$n1=1.8830 \tag{F1}$$

$$NAob=1.05 \tag{F2}$$

$$NAob*d0=1.05*0.83=0.8715 \tag{F3}$$

$$NAob/\beta=1.05/30\cong0.035 \tag{F4}$$

$$f2a/f2b=24.177/25.888\cong0.934 \tag{F5}$$

$$|nx-ny|=|1.63775-1.49700|=0.1405 \tag{F6}$$

$$|vx-vy|=|42.41-81.14|=38.73 \tag{F7}$$

$$d1/d=7.5776/48.66\cong0.1557 \tag{F8}$$

$$fm/fs=-4.3349/17.1745\cong0.2524 \tag{F9}$$

$$fs/ds=17.1745/2.5326\cong6.7813 \tag{F10}$$

$$Rmob/Rmim=-1.275/-4.6928\cong0.2717 \tag{F11}$$

$$|f3a/f3b|=|10.124/109.102|\cong0.0928 \tag{F12}$$

$$|f/f2c|=|6/113.207|\cong0.053 \tag{F13}$$

Figure 13:
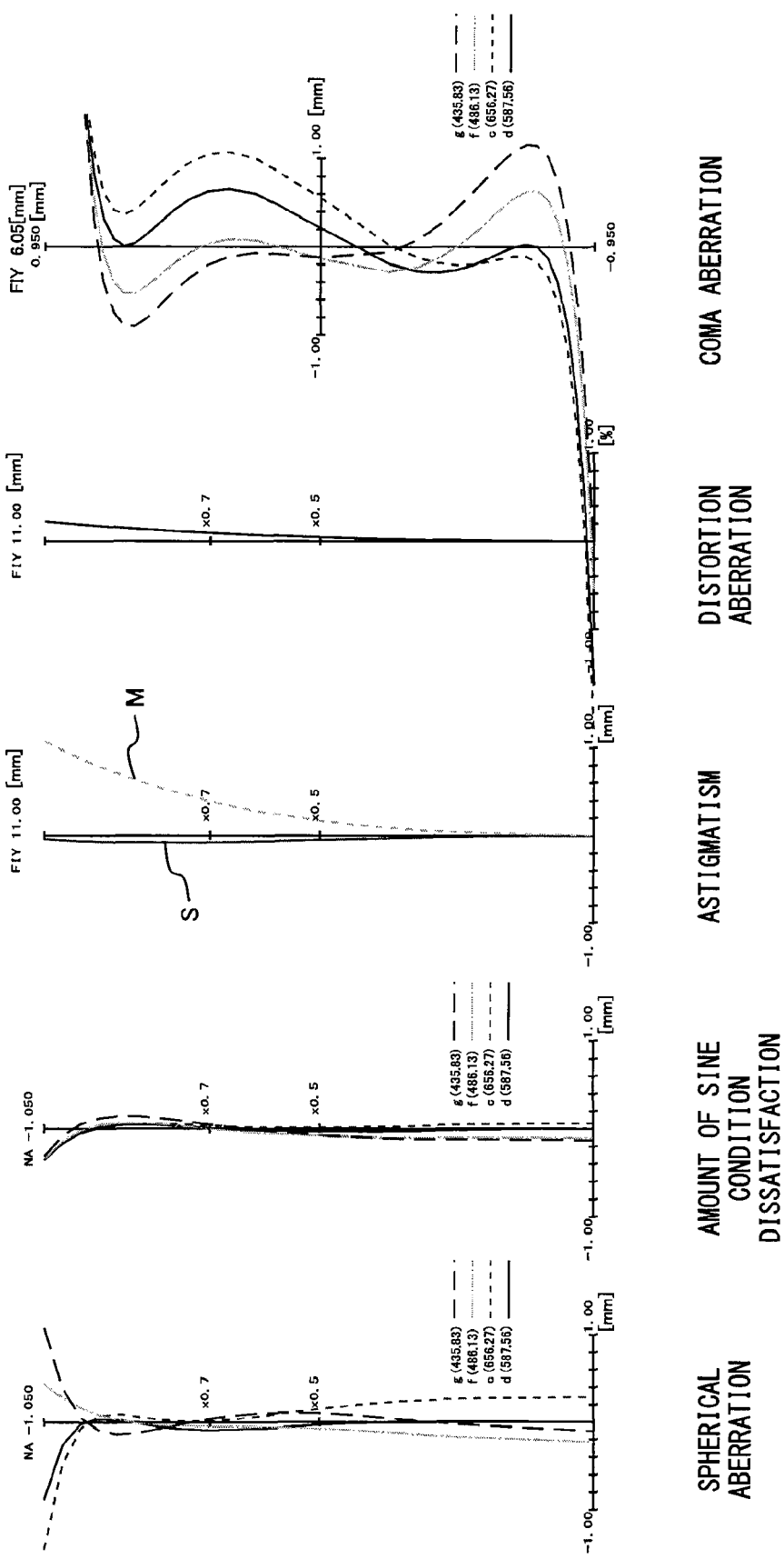
FIG. 13 illustrates the various types of aberrations in an immersion microscope objective according to the sixth preferred embodiment of the present invention.

FIG. 13 illustrates aberrations on the imaging surface on the image side in the case where an objective 7 and a tube lens 2 according to this preferred embodiment are combined and used. The tube lens 2 is the same as that of the first preferred embodiment. The space between the objective 7 and tube lens 2 is also the same as that in the first preferred embodiment. FIG. 13 illustrates spherical aberration, the amount of sine condition dissatisfaction, astigmatism, distortion aberration and coma aberration. All of them are effectively corrected. "NA" and "FIT" in FIG. 13 are the numerical aperture on the object side of the objective 7 and image height (mm), respectively. "M" and "S" indicate a meridional component and a sagittal component, respectively.

Seventh Embodiment

Figure 14:
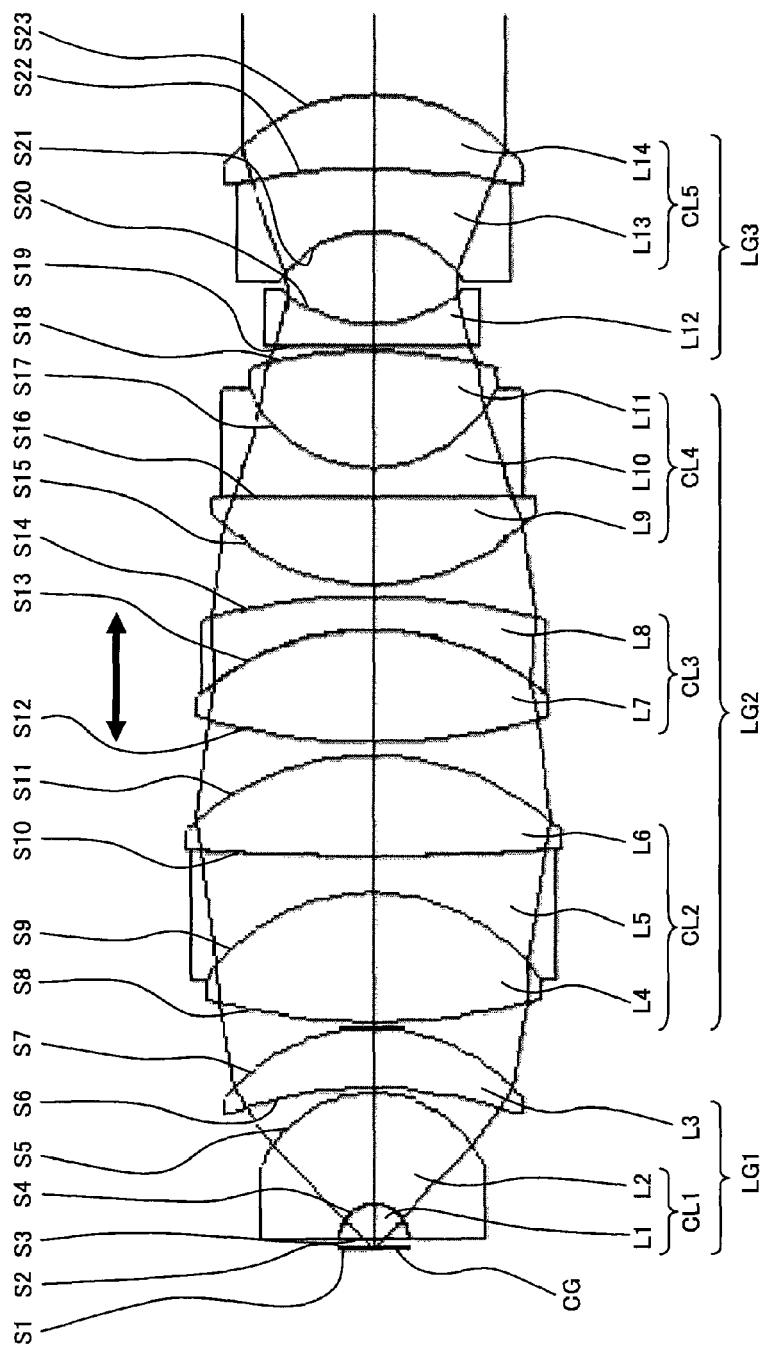
FIG. 14 is a cross-sectional view of an immersion microscope objective according to the seventh preferred embodiment of the present invention.

FIG. 14 is a cross-sectional view of an immersion microscope objective according to this preferred embodiment. An objective 8 comprises a first lens group LG1 having a positive refractive power, a second lens group LG2 having a positive refractive power and a third lens group LG3 having a negative refractive power, in order from the object side.

Since the structure and function of the objective 7 are the same as those of the objective 6 except that a cemented lens CL4 included in the second lens group comprises a plano-convex lens L9 whose surface is convex toward the object side, a plane-concave lens L10 whose surface is convex toward the image side, and a biconvex lens L11, their explanation is omitted.

The various data in this preferred embodiment will be described below.

The focal length f, magnification 13, numerical aperture NAob on the object side and working distance d0 of the objective 8 in this preferred embodiment are as follows. In this case, the working distance d0 indicates a working distance in the case where the cover glass has a regulated thickness.

f=6 mm
β=30
NAob=1.0
d0=1.03 mm

The thickness dc, refractive index nc, and Abbe number vc of the cover glass CG exemplified in FIG. 14 are as follows and are the same as those of the first preferred embodiment. Although the thickness dc of the cover glass CG is regulated, it can be changed within a range to be described later.

dc=0.17 mm
nc=1.521
vc=43.1 the refractive index n and Abbe number v of an immersion liquid with which the area between the surface with surface number S2 and the surface with surface number S3 nearest the object side of the first lens group is filled are as follows and are the same as those of the first preferred embodiment.

n=1.4041
v=51.9

The lens data of the objective 8 in this preferred embodiment is as follows.

Objective 8

| S | r(mm) | ld(mm) | nd | vd |
|---|---|---|---|---|
| S3 | INF | 0.8200 | 1.45853 | 67.94 |
| S4 | −1.5000 | 4.7150 | 1.88300 | 40.76 |
| S5 | −5.3937 | 0.2000 | | |
| S6 | −18.5536 | 2.6077 | 1.88300 | 40.76 |
| S7 | −8.6885 | 0.2000 | | |
| S8 | 28.9166 | 5.6343 | 1.49700 | 81.14 |
| S9 | −9.0860 | 1.5000 | 1.63775 | 42.41 |
| S10 | 106.1239 | 4.3727 | 1.43875 | 94.93 |
| S11 | −12.2071 | Da | | |
| S12 | 27.9119 | 4.7859 | 1.43875 | 94.93 |
| S13 | −11.8278 | 1.4500 | 1.88300 | 40.76 |
| S14 | −28.1543 | Db | | |
| S15 | 10.1098 | 3.7553 | 1.49700 | 81.14 |
| S16 | INF | 1.2200 | 1.63775 | 42.41 |
| S17 | 6.0410 | 5.0020 | 1.43875 | 94.93 |
| S18 | −20.2465 | 0.2000 | | |
| S19 | 143.1431 | 1.0000 | 1.73800 | 32.26 |
| S20 | 6.4395 | 4.0000 | | |
| S21 | −4.9028 | 2.6307 | 1.48749 | 70.23 |
| S22 | −28.4896 | 3.2217 | 1.73800 | 32.26 |
| S23 | −8.5834 | | | |

In this case, in the objective 8, a surface with surface number S3 indicates a lens surface nearest the object side of the objective 8. The space or thickness of a lens with surface number S3 indicates the space or thickness between the surfaces with surface numbers S3 and S4. The refractive index at the d-line of a lens with surface number S3 indicates the refractive index at the d-line of a medium between the surfaces with surface numbers S3 and S4. The Abbe number at the d-line of the lens of surface number S3 indicates the Abbe number at a medium between the surfaces with surface numbers S3 and S4. Furthermore, the space between surface numbers S11 and S12 and the space between surface numbers S14 and S15 are variable values Da and Db, respectively, which change according to the movement along the optical axis of the cemented lens CL3.

A relation among the thickness dc of a cover glass, the working distance d0 and the variable values Da and Db is as follows.

Thickness dc of a cover glass, and working distance d0 and surface space Da and Db

| dc(mm) | d0(mm) | Da(mm) | Db(mm) |
|---|---|---|---|
| 0.0900 | 1.1019 | 0.5300 | 0.6136 |
| 0.1700 | 1.0300 | 0.6245 | 0.5191 |
| 0.1900 | 1.0119 | 0.6436 | 0.5000 |

The objective 8 in this preferred embodiment satisfies conditions (1) through (13), as illustrated in the following expressions (G1) through (G13). The expressions (G1) through (G13) correspond to conditions (1) through (13), respectively.

$$n1=1.8830 \tag{G1}$$

$$NAob=1.0 \tag{G2}$$

$$NAob*d0=1.0*1.03=1.03 \tag{G3}$$

$$f2a/f2b=29.091/26.265 \cong 1.108 \tag{G5}$$

$$|nx-ny|=|1.63775-1.49700|=0.1405 \tag{G6}$$

$$|vx-vy|=|42.41-81.14|=38.73 \tag{G7}$$

$$d1/d=8.3427/48.4589 \cong 0.1722 \tag{G8}$$

$$fm/fs=-5.4452/16.4651 \cong -0.3307 \tag{G9}$$

$$fs/ds=16.4651/2.6077 \cong 6.314 \tag{G10}$$

$$Rmob/Rmim=-1.5/-5.3937 \cong 0.2781 \tag{G11}$$

$$|f3a/f3b|=|9.165/113.32| \cong 0.0809 \tag{G12}$$

$$|f/f2c|=|6/96.838| \cong 0.062 \tag{G13}$$

Figure 15:
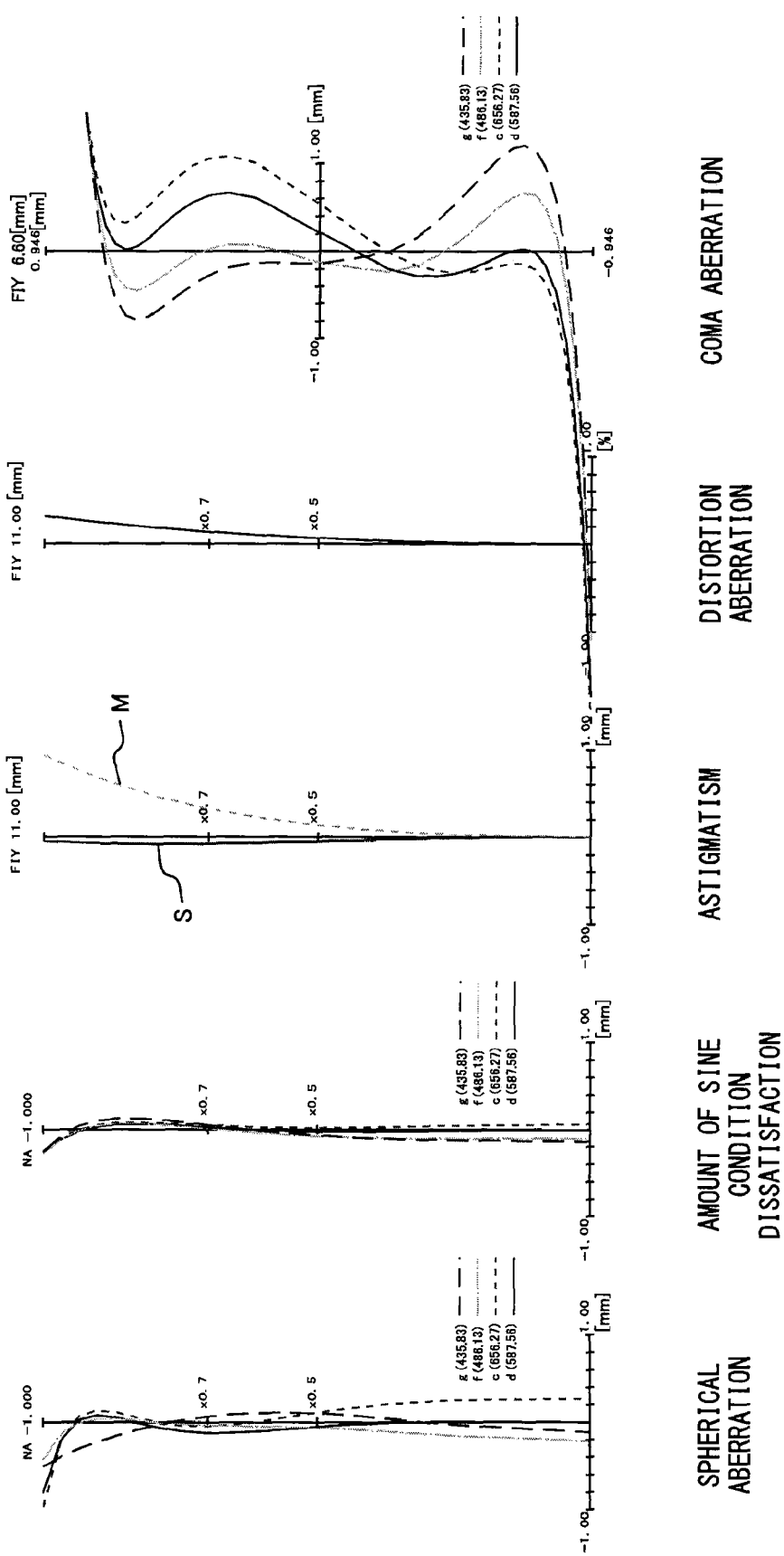
FIG. 15 illustrates the various types of aberrations in an immersion microscope objective according to the seventh preferred embodiment of the present invention.

FIG. 15 illustrates aberrations on the imaging surface on the image side in the case where an objective 8 and a tube lens 2 according to this preferred embodiment are combined and used. The tube lens 2 is the same as that of the first preferred embodiment. The space between the objective 8 and tube lens 2 is also the same as that in the first preferred embodiment. FIG. 15 illustrates spherical aberration, the amount of sine condition dissatisfaction, astigmatism, distortion aberration and coma aberration. All of them are effectively corrected. "NA" and "FIT" in FIG. 15 are the numerical aperture on the object side of the objective 8 and image height (mm), respectively. "M" and "S" indicate a meridional component and a sagittal component, respectively.

Microscope

A microscope for which objectives according to the above-described first through seventh preferred embodiments are suited to be used is particularly suitable for the usage to be explained below.

A confocal microscope with a confocal aperture is suitable for the usage of an objective according to the above-described first through seventh preferred embodiments.

Figure 16:
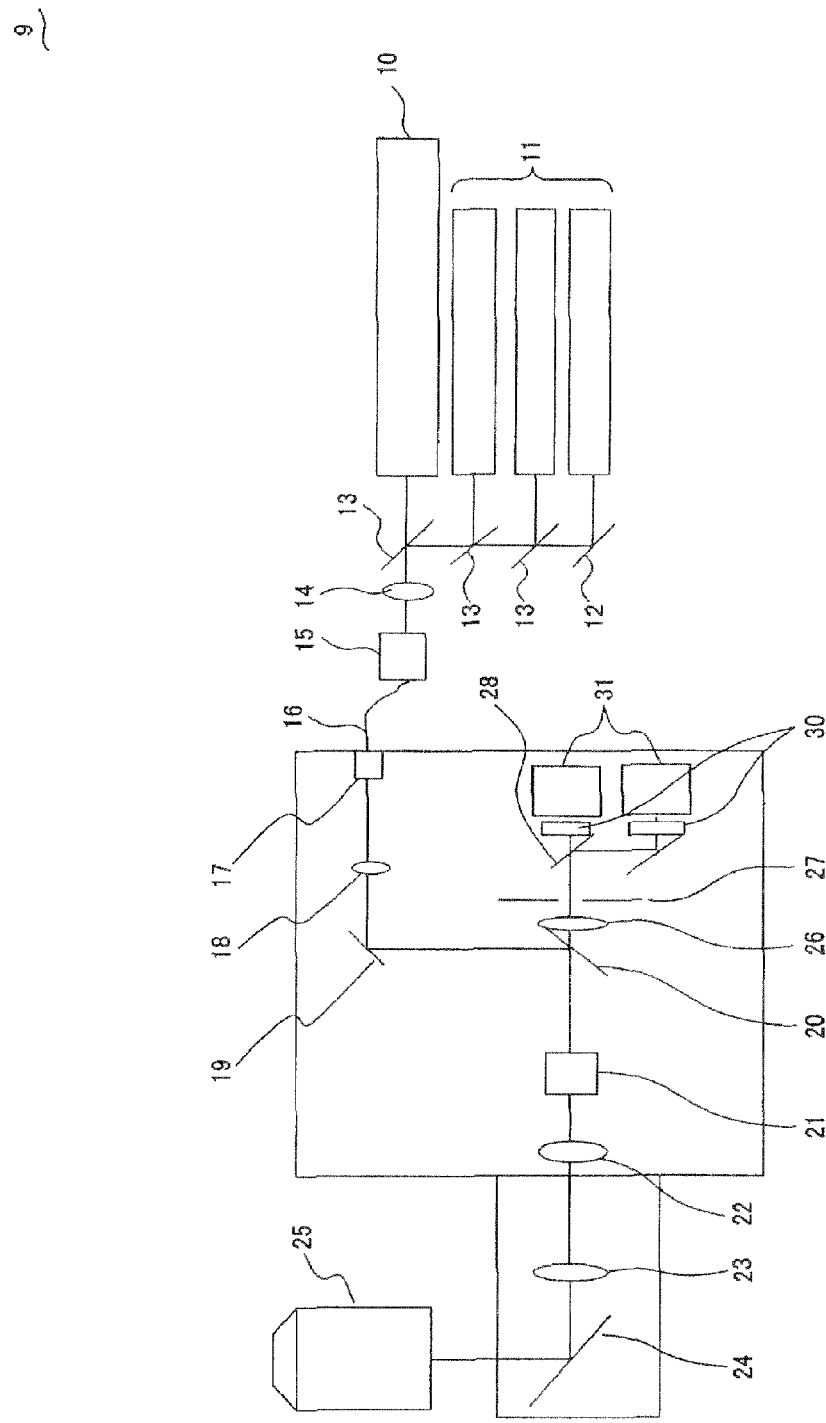
FIG. 16 exemplifies the structure of a confocal microscope including an immersion microscope objective according to one preferred embodiment of the present invention.

FIG. 16 exemplifies the structure of a confocal microscope with a confocal stop. A confocal microscope 9 exemplified in FIG. 16 comprises laser light sources (shortwave laser 10 and visible light laser 11) for emitting laser light as illumination light, a separation unit (dichroic mirror 13) for separating fluorescent light generated from a specimen from illumination light, a scanning unit (galvano-meter mirror 21) for scanning a specimen, an objective 25, a confocal stop 27 disposed in a position optically conjugate with the focal position of the objective 25, and a detector 31 for detecting fluorescent light that has passed through the confocal stop 27.

Laser light emitted from the shortwave laser 10 or the visible light laser 11 is input to a condensing lens 14 via the mirror 12 and the dichroic mirror 13 and condensed on a fiber coupling mechanism 15 by the condensing lens 14. The position and inclination of the laser light input to a single-mode fiber 16 from the fiber coupling mechanism 15 is adjusted by a fiber adjustment mechanism 17 and is emitted from the single-mode fiber 16. The laser light emitted from the single-mode fiber 16 is converted to parallel light by a collimating lens 18 and is input to the objective 25 via the mirror 19, the dichroic mirror 20, the galvano-meter mirror 21a pupil projection lens 22, a lens 23 and a mirror 24. The objective 25 applies the laser light to a specimen disposed at the focal position of the objective 25.

Fluorescent light generated from the specimen by applying the laser light advances through the same optical path as that taken by the laser light in the opposite direction and enters the dichroic mirror 20. The fluorescent light passes through the dichroic mirror 20 having a characteristic of reflecting laser light and enabling fluorescent light to be transmitted through it and is condensed on the focal stop 27 by a tube lens 26. Since the focal stop 27 is disposed in a position optically conjugate with the focal position of the objective 25, the only fluorescent light generated from the focal position passes through a pinhole provided in the confocal stop 27. the fluorescent light that has passed through the focal stop 27 is transmitted through or is reflected by the dichroic mirror 28 depending on its wavelength. The fluorescent light passes through a barrier filter 30 and is detected by the detector 31.

A confocal microscope such as the confocal microscope 9 exemplified in FIG. 16 and the like is widely used for fluorescent observation targeting a living body specimen. Since the confocal microscope has a high resolution in the Z direction due to a confocal effect, it can observe the deep parts of a specimen. However, when observing the deep parts of a specimen, it is required that an objective have a long working distance in order to avoid contact between the objective and the specimen. In order to obtain a bright image while suppressing damage to a living body specimen, it becomes necessary for an objective to have a large numerical aperture. Therefore, a confocal microscope is suitable for the usage of the objectives exemplified in the first through seventh preferred embodiments.

The objectives exemplified in the first through seventh preferred embodiments are also suitably used for a two-photon excitation microscope.

Figure 17:
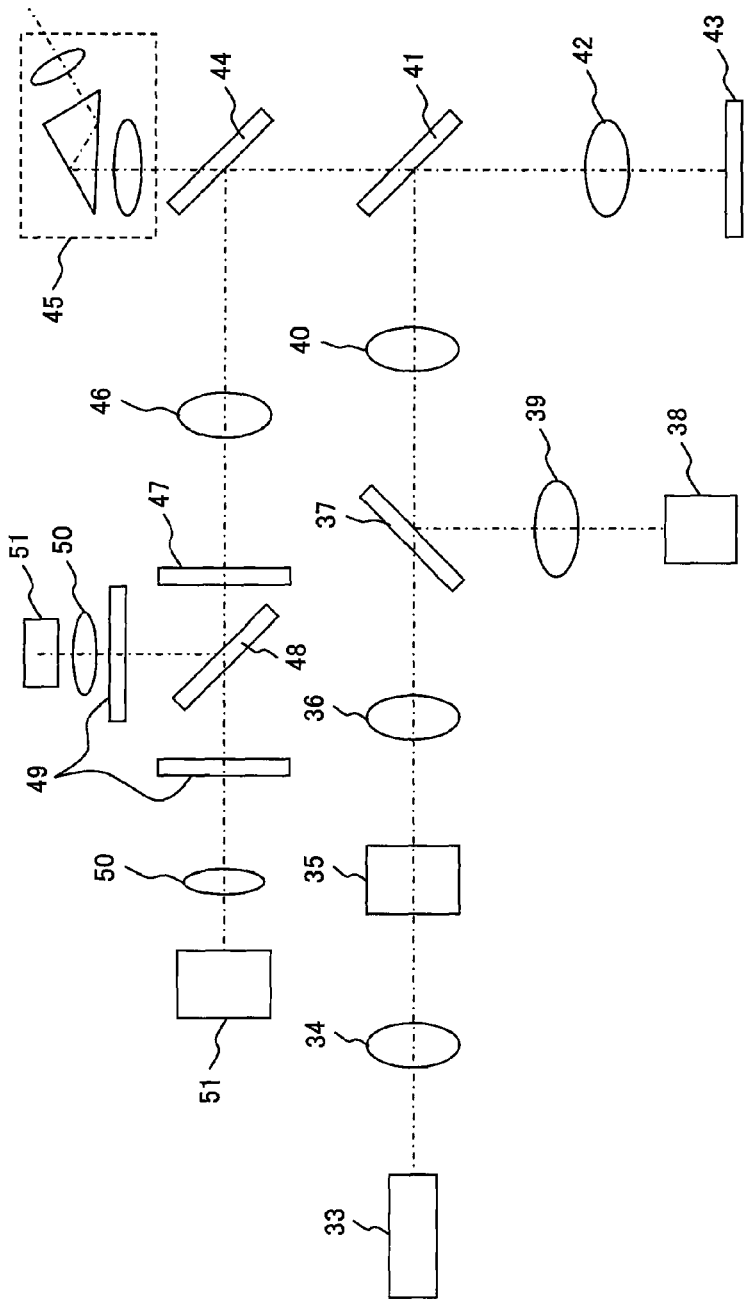
FIG. 17 exemplifies the structure of a two-photon excitation microscope including an immersion microscope objective according to one preferred embodiment of the present invention.

FIG. 17 exemplifies the structure of a two-photon excitation microscope. A two-photon excitation microscope 32 exemplified in FIG. 17 comprises an ultra-short pulsed laser 33 for emitting laser light for causing two-photon excitation in a specimen 43, a separation unit (dichroic mirror 41) for separating fluorescent light generated from the specimen 43 from laser light, an objective 42, a scanning unit (galvano-meter mirror 35) for scanning the specimen 43 and a detector 51 for detecting fluorescent light generated from the specimen 43 by two-photon excitation. An ultra-short pulsed laser in a near-infrared range is preferable as the ultra-short pulsed laser 33 in order to enable laser light to reach the deep parts of a specimen.

Laser light emitted from the ultra-short pulsed laser 33 is input to a dichroic mirror 37 via an illumination lens 34, the galvano-meter mirror 35 and a pupil projection lens 36 and passes through the dichroic mirror 37. Laser light passed through the dichroic mirror 37 is input to the dichroic mirror 41 via a tube lens 40 and is reflected by the dichroic mirror 41 and is input to the objective 42. The objective 42 applies the laser light emitted from the ultra-short pulsed laser 33 to the specimen 43 disposed at a focal position of the objective 42.

The specimen 43 to which laser light is applied causes two-photon excitation to emit fluorescent light. The fluorescent light enters the objective 42 and is transmitted through the dichroic mirror 41. The mirror 44 is disposed in an optical path in a detachable/attachable state. If the mirror 44 is removed from the optical path, laser light enters an eyepiece 45. Thus, an observer can directly observe the specimen 43. If the mirror 44 is inserted in the optical path, laser light is reflected on the mirror 44 and enters the dichroic mirror 48 via the pupil projection lens 46 and a laser-cut filter 47. Laser light that has entered a dichroic mirror 48 is transmitted through or is reflected on the dichroic mirror 48 depending on its wavelength and is detected by the detector 51 via a barrier filter 49 and a pupil projection lens 50.

Furthermore, a two-photon excitation microscope 32 has a laser 38 and an illumination lens 39 in order to illuminate the specimen 43 within a wide range. Thus, the specimen 43 can also be stimulated by the ultra-short pulsed laser 33 while the specimen 43 is illuminated within a wide range by the laser 38.

A two-photon excitation microscope, such as the two-photon excitation microscope 32 exemplified in FIG. 17, is also used for fluorescent observation targeting a living body specimen. Therefore, a long working distance and a large numerical aperture are required for an objective used for a two-photon excitation microscope, for the same reason as an objective is used for a confocal microscope. In a two-photon excitation microscope, fluorescent light is generated only from a focal position. Therefore, it is necessary for an objective to take in as much fluorescent light as possible, including scattered fluorescent light. In this case, it is preferable that an objective have a low magnification. Therefore, a two-photon excitation microscope is suitable for the objectives exemplified in the first through seventh preferred embodiments.

FIG. 18 explains the change characteristic of the focal position of an objective due to the wavelength in the two-photon excitation microscope exemplified in FIG. 17. The vertical and horizontal axes illustrated in FIG. 18 indicate the amount of change (mm) of the focal position of an objective from the reference position and the wavelength (nm) of laser light, respectively. A broken line E5, a one-dotted chain line E6, and a solid line E7 indicate the characteristic of the two-photon excitation microscope 32 using objectives according to the fifth, sixth and seventh preferred embodiments, respectively. A solid line FD indicates a depth of focus.

As exemplified in FIG. 18, the two-photon excitation microscope 32 using objectives according to the fifth through seventh preferred embodiments displays a good characteristic in a wide range of wavelength. More particularly, in the two-photon excitation microscope 32, the change in width of the focal position of an objective stays within the focal depth in a near-infrared range including the wavelength range of laser light emitted from the ultra-short pulsed laser 33 in addition to a visible light range.

Besides a confocal microscope and a two-photon excitation microscope, a microscope for a time-lapse observation is suitable for objectives exemplified in the first through seventh preferred embodiments. In a time-lapse observation, a living body specimen contained in an incubator is observed for a long time. In this case, since it is necessary to suppress damage to a living body specimen as much as possible, a large numerical aperture is required for an objective. In order to observe the movement of a cell, a wide field of view is required for an objective. Therefore, a microscope for making time-lapse observation is suitable for the use of objectives according to the fifth through seventh preferred embodiments.

What is claimed as:

1. An immersion microscope objective, comprising, in order from an object side:
    a first lens group having a positive refractive power, comprising a cemented lens composed of a plano-convex lens whose plane surface faces the object side and a meniscus lens whose concave surface faces the object side, and at least one single lens having a positive refractive power;
    a second lens group having a positive refractive power, comprising a three-piece cemented lens; and
    a third lens group having a negative refractive power comprising a Gaussian type lens structure,
    wherein the immersion microscope objective satisfies the following conditions:

$1.7 \leq n1$ $0.75 \leq NAob \leq 1.45$ $0.4 \leq NAob*d0 \leq 3$ $0.03 \leq NAob/\beta \leq 0.1$, where n1 is a refractive index at a d-line of the single lens having a highest refractive index included in the first lens group, NAob is a numerical aperture on the object side of the immersion microscope objective, d0 is a working distance of the immersion microscope objective, and $\beta$ is a magnification of the immersion microscope objective.

2. The immersion microscope objective according to claim 1, wherein the second lens group comprises at least two cemented lenses, and a cemented lens of the at least two cemented lenses that is disposed nearest the object side of the second lens group is a first three-piece cemented lens composed of a positive refractive lens, a negative refractive lens, and a positive refractive lens, and
    wherein the immersion microscope objective satisfies the following conditions:

$0.35 < f2a/f2b < 2$ $|nx-ny| < 0.35$ $30 < |vx-vy|$, where f2a is a focal length of the first three-piece cemented lens, f2b is a focal length of a cemented lens nearest an image side of the second lens group, nx is a refractive index at a d-line of a positive refractive lens of the first three-piece cemented lens, vx is an Abbe number at a d-line of a positive refractive lens of the first three-piece cemented lens, nv is a refractive index at a d-line of a negative refractive lens of the first three-piece cemented lens, and vy is an Abbe number at a d-line of a negative refractive lens of the first three-piece cemented lens.

3. The immersion microscope objective according to claim 1, wherein the second lens group comprises, in order from the object side:
    a first three-piece cemented lens composed of a positive refractive lens, a negative refractive lens, and a positive refractive lens;
    a lens; and
    a second three-piece cemented lens composed of a positive refractive lens, a negative refractive lens element, and a positive refractive lens.

4. The immersion microscope objective according to claim 1,
- wherein the at least one single lens of the first lens group comprises only one single lens, and
- wherein the immersion microscope objective satisfies the following conditions:

$$0.12 \leq d1/d \leq 0.3$$

$$-1 \leq fm/fs \leq 0$$

$$2.5 \leq fs/ds \leq 6.3$$

$$0.2 \leq Rmob/Rmim \leq 0.5,$$

where d1 is a total length of the first lens group, d is a total length of the immersion microscope objective, ds is a length of the only one single lens, fm is a focal length of the meniscus lens, fs is a focal length of the only one single lens, Rmob is a radius of curvature on the object side of the meniscus lens, and Rmim is a radius of curvature on the image side of the meniscus lens.

5. The immersion microscope objective according to claim 1, wherein the third lens group comprises the Gaussian type lens structure composed of a single lens whose concave surface faces an image side and a cemented lens whose concave surface faces the object side in order from the object side, and the immersion microscope objective satisfies the following condition:

$$0.05 < |f3a/f3b| < 0.5,$$

where f3a is a focal length of the single lens composing the Gaussian type lens structure and f3b is a focal length of the cemented lens composing the Gaussian type lens structure and whose concave surface faces an object side.

6. The immersion microscope objective according to claim 1, wherein the second lens group comprises a movable cemented lens and the immersion microscope objective satisfies the following condition:

$$|f/f2c| < 0.2,$$

where f is a focal length of the entire immersion microscope objective, and f2c is a focal length of the movable cemented lens.

7. The immersion microscope objective according to claim 1,
- wherein the at least one single lens of the first lens group comprises two or more single lenses; and
- wherein the immersion microscope objective satisfies the following conditions:

$$0.12 \leq d1/d \leq 0.3$$

$$-1 \leq fm/fs \leq 0$$

$$2.5 \leq fs/ds \leq 6.3$$

$$0.2 \leq Rmob/Rmim \leq 0.5,$$

where dl is a total length of the first lens group, d is a total length of the immersion microscope objective, ds is a total length of the two or more single lenses, fm is a focal length of the meniscus lens, fs is a composite focal length of the two or more single lenses, Rmob is a radius of curvature on the object side of the meniscus lens, and Rmim is a radius of curvature on the image side of the meniscus lens.

8. An immersion microscope objective, comprising, in order from an object side:
- a first lens group having a positive refractive power, comprising a cemented lens composed of a plano-convex lens whose plane surface faces the object side and a meniscus lens whose concave surface faces the object side, and at least one single lens having a positive refractive power;
- a second lens group having a positive refractive power, comprising a three-piece cemented lens; and
- a third lens group having a negative refractive power, comprising a Gaussian type lens structure,
- wherein the second lens group comprises, in order from the object side:
  - a first three-piece cemented lens composed of a positive refractive lens, a negative refractive lens, and a positive refractive lens;
  - a lens; and
  - a second three-piece cemented lens composed of a positive refractive lens, a negative refractive lens, and a positive refractive lens.

9. A confocal microscope, comprising:
- an immersion microscope objective;
- a laser light source for emitting laser light;
- a separation unit for separating fluorescent light generated from a specimen to which the laser light is applied from the laser light source;
- a scanning unit for scanning the specimen;
- a confocal stop disposed in a position optically conjugate with a focal position of the immersion microscope objective; and
- a detector for detecting the fluorescent light that has passed through the confocal stop,
- wherein the immersion microscope objective comprises, in order from an object side:
  - a first lens group having a positive refractive power, comprising a cemented lens composed of a plano-convex lens whose plane surface faces the object side and a meniscus lens whose concave surface faces the object side, and at least one single lens having a positive refractive power;
  - a second lens group having a positive refractive power, comprising a three-piece cemented lens; and
  - a third lens group having a negative refractive power comprising a Gaussian type lens structure, and
- wherein the immersion microscope objective satisfies the following conditions:

$$1.7 \leq n1$$

$$0.75 \leq NAob \leq 1.45$$

$$0.4 \leq NAob*d0 \leq 3$$

$$0.03 \leq NAob/\beta \leq 0.1,$$

where n1 is a refractive index at a d-line of the single lens having a highest refractive index included in the first lens group, NAob is a numerical aperture on the object side of the immersion microscope objective, d0 is a working distance of the immersion microscope objective, and β is a magnification of the immersion microscope objective.

10. A two-photon excitation microscope, comprising:
- an immersion microscope objective;
- an ultra-short pulse laser light source for emitting laser light which causes two-photon excitation in a specimen;
- a separation unit for separating fluorescent light generated from the specimen to which the laser light is applied from the laser light source;
- a scanning unit for scanning the specimen;

a detector for detecting the fluorescent light,
wherein the immersion microscope objective comprises, in order from an object side:
- a first lens group having a positive refractive power, comprising a cemented lens composed of a plano-convex lens whose plane surface faces the object side and a meniscus lens whose concave surface faces the object side, and at least one single lens having a positive refractive power;
- a second lens group having a positive refractive power, comprising a three-piece cemented lens; and
- a third lens group having a negative refractive power comprising a Gaussian type lens structure, and wherein the immersion microscope objective satisfies the following conditions:

$$1.7 \leq n1$$

$$0.75 \leq NAob \leq 1.45$$

$$0.4 \leq NAob*d0 \leq 3$$

$$0.03 \leq NAob/\beta \leq 0.1,$$

where n1 is a refractive index at a d-line of the single lens having a highest refractive index included in the first lens group, NAob is a numerical aperture on the object side of the immersion microscope objective, d0 is a working distance of the immersion microscope objective, and $\beta$ is a magnification of the immersion microscope objective.

* * * * *

UNITED STATES PATENT AND TRADEMARK OFFICE
CERTIFICATE OF CORRECTION

| | |
|---|---|
| PATENT NO. | : 8,358,469 B2 |
| APPLICATION NO. | : 12/761463 |
| DATED | : January 22, 2013 |
| INVENTOR(S) | : Takashi Kasahara |

Page 1 of 1

It is certified that error appears in the above-identified patent and that said Letters Patent is hereby corrected as shown below:

In the specification

Column 2, Line 1, change "$0.4 \leq NAob*d0 \leq 3$" to --$0.4mm \leq NAob*d0 \leq 3mm$--.

Column 2, Line 61, change "$0.4 \leq NAob*d0 \leq 3$" to --$0.4mm \leq NAob*d0 \leq 3mm$--.

Column 3, Line 25, change "$0.4 \leq NAob*d0 \leq 3$" to --$0.4mm \leq NAob*d0 \leq 3mm$--.

Column 5, Line 48, change "$0.4 \leq NAob*d0 \leq 3$" to --$0.4mm \leq NAob*d0 \leq 3mm$--.

Column 12, Line 40, change "$NAob*d0=1.1*0.53=0.583$" to --$NAob*d0=1.1*0.53=0.583mm$--.

Column 15, Line 1, change "$NAob*d0=1.1*0.53=0.583$" to --$NAob*d0=1.1*0.53=0.583mm$--.

Column 17, Line 13, change "$NAob*d0=1.2*0.53=0.636$" to --$NAob*d0=1.2*0.53=0.636mm$--.

Column 18, Line 51, change "$NAob*d0=1.2*0.53=0.636$" to --$NAob*d0=1.2*0.53=0.636mm$--.

Column 21, Line 7, change "$NAob*d0=1.1*0.53=0.583$" to --$NAob*d0=1.1*0.53=0.583mm$--.

Column 23, Line 7, change "$NAob*d0=1.05*0.83=0.8715$" to --$Naob*d0=1.05*0.83=0.8715mm$--.

Column 25, Line 11, change "$NAob*d0=1.0*1.03=1.03$" to --$NAob*d0=1.0*1.03=1.03mm$--.

In the claims

Column 28, Line 24, change "$0.4 \leq NAob*d0 \leq 3$" to --$0.4mm \leq NAob*d0 \leq 3mm$--.

Column 30, Line 51, change "$0.4 \leq NAob*d0 \leq 3$" with --$0.4mm \leq NAob*d0 \leq 3mm$--.

Column 32, Line 5, change "$0.4 \leq NAob*d0 \bullet \leq 3$" to --$0.4mm \leq NAob*d0 \leq 3mm$--.

Signed and Sealed this
Ninth Day of August, 2016

Michelle K. Lee
*Director of the United States Patent and Trademark Office*